US012711352B2

(12) United States Patent
Salameh et al.

(10) Patent No.: US 12,711,352 B2
(45) Date of Patent: Aug. 18, 2026

(54) SYSTEMS, APPARATUSES, METHODS, AND NON-TRANSITORY COMPUTER-READABLE STORAGE DEVICES FOR OPTIMIZING ARTIFICIAL NEURAL NETWORK

(71) Applicant: HUAWEI TECHNOLOGIES CO., LTD., Shenzhen (CN)

(72) Inventors: Mohammad Salameh, Edmonton (CA); Fred Xuefei Han, Edmonton (CA); Negar Hassanpour, Edmonton (CA); Keith George Mills, Edmonton (CA); Di Niu, Edmonton (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 511 days.

(21) Appl. No.: 18/372,919

(22) Filed: Sep. 26, 2023

(65) Prior Publication Data

US 2025/0094766 A1 Mar. 20, 2025

Related U.S. Application Data

(60) Provisional application No. 63/539,549, filed on Sep. 20, 2023.

(51) Int. Cl.

*G06N 3/00* (2023.01)
*G06N 3/04* (2023.01)
*G06N 3/08* (2023.01)

(52) U.S. Cl.

CPC ................. *G06N 3/04* (2013.01); *G06N 3/08* (2013.01)

(58) Field of Classification Search

CPC ............. G06N 3/04; G06N 3/08; G06N 3/082
See application file for complete search history.

(56) References Cited

U.S. PATENT DOCUMENTS

| | | | | |
|---|---|---|---|---|
| 10,469,869 | B1 * | 11/2019 | Li | H04N 19/577 |
| 10,474,497 | B1 * | 11/2019 | Kancharla | G06F 9/546 |
| 10,609,384 | B2 * | 3/2020 | Chen | H04N 19/52 |
| 10,638,144 | B2 * | 4/2020 | Larumbe | G06V 10/84 |
| 11,206,428 | B1 * | 12/2021 | Zhao | H04N 19/136 |
| 11,755,367 | B2 * | 9/2023 | Vee | G06F 9/4881<br>718/102 |
| 12,374,102 | B2 * | 7/2025 | Müller | G06F 30/27 |
| 12,579,715 | B2 * | 3/2026 | Epstein | G06T 11/60 |

(Continued)

*Primary Examiner* — Frank F Huang
(74) *Attorney, Agent, or Firm* — Tim Tingkang Xia, Esq.; Troutman Pepper Locke LLP

(57) ABSTRACT

A computerized method has the steps of: generating an input computational graph (CG) for representing a neural architecture, and performing a plurality of optimization steps for at least one iteration to obtain a modified neural architecture represented by a modified CG, for obtaining a neural network for use in one or more computing devices. The optimization steps include: identifying one or more subgraphs from the input CG, obtaining the modified CG by replacing the identified one or more subgraphs with one or more replacement subgraphs, respectively, evaluating one or more metrics of a modified neural-network architecture represented by the modified CG, and based on the evaluation, selecting the modified CG or the input CG. When the optimization steps are performed for multiple iterations, the selected CG obtained in one iteration is used as the input CG for a next iteration.

20 Claims, 11 Drawing Sheets

(56) References Cited

U.S. PATENT DOCUMENTS

| | | | | |
|---|---|---|---|---|
| 2005/0058197 | A1* | 3/2005 | Lu | H04N 19/40 375/240.03 |
| 2019/0278808 | A1* | 9/2019 | Xia | G06F 16/9024 |
| 2019/0317804 | A1* | 10/2019 | Gong | G06F 9/547 |
| 2019/0317812 | A1* | 10/2019 | Gebara | G06Q 40/04 |
| 2020/0050633 | A1* | 2/2020 | Evans | H04L 43/045 |
| 2020/0167404 | A1* | 5/2020 | Gielis | G06F 17/11 |
| 2020/0244976 | A1* | 7/2020 | Zhao | H04N 19/196 |
| 2020/0249998 | A1* | 8/2020 | Che | G06N 3/045 |
| 2020/0302302 | A1* | 9/2020 | Tucker | G06F 9/5038 |
| 2020/0396487 | A1* | 12/2020 | Nalci | H04N 19/122 |
| 2021/0120252 | A1* | 4/2021 | Koo | H04N 19/184 |
| 2021/0190508 | A1* | 6/2021 | Alsharif | G06F 9/4843 |

* cited by examiner

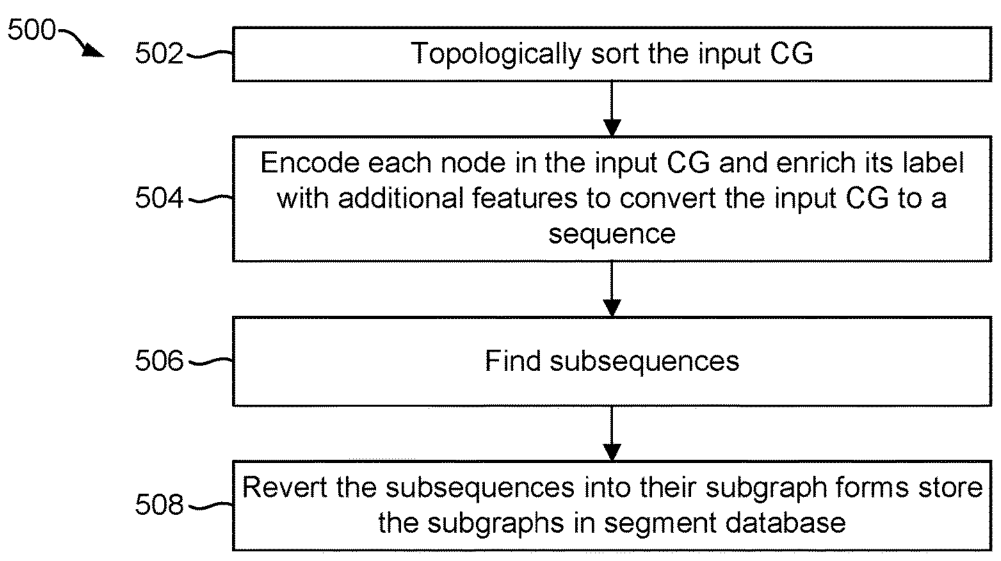
FIG. 7
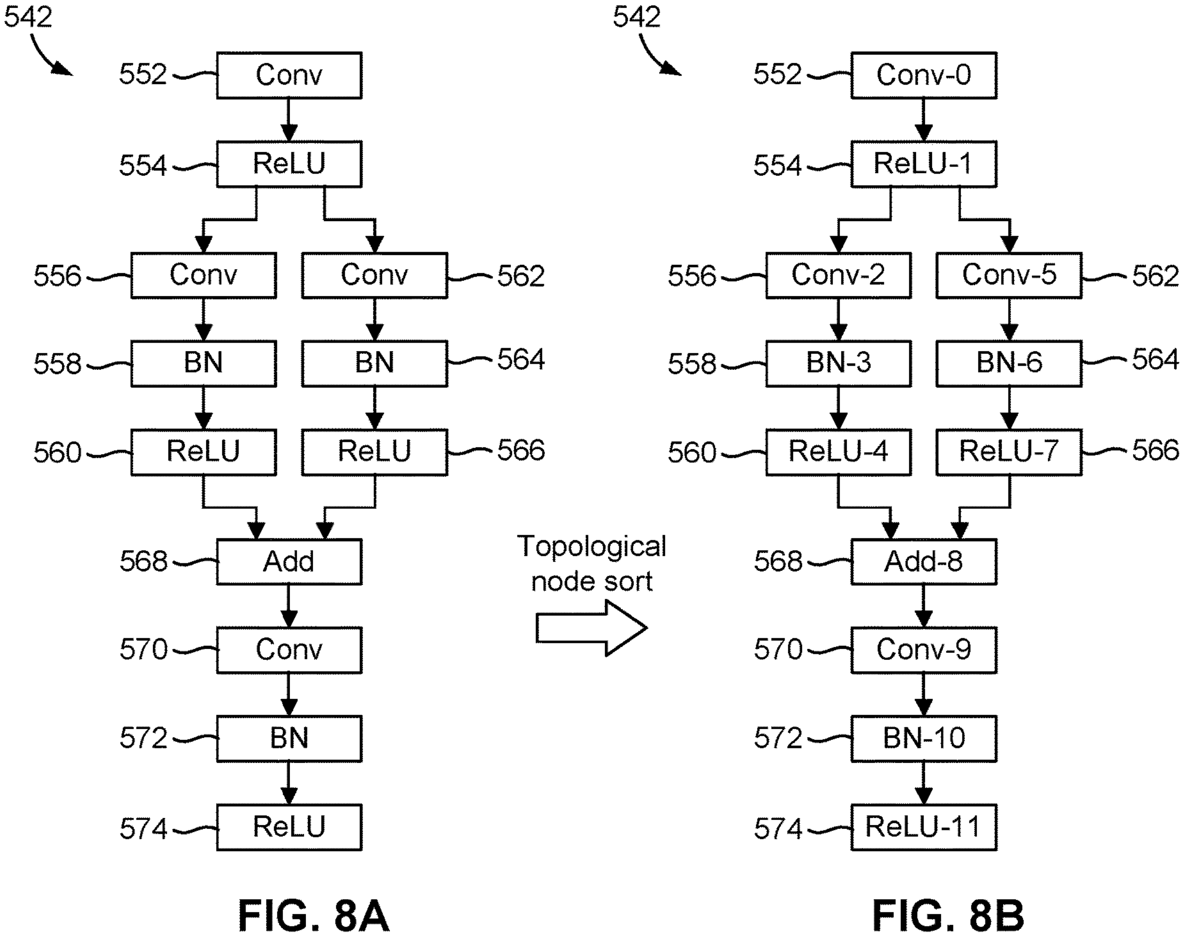
FIG. 8A
FIG. 8B

SYSTEMS, APPARATUSES, METHODS, AND NON-TRANSITORY COMPUTER-READABLE STORAGE DEVICES FOR OPTIMIZING ARTIFICIAL NEURAL NETWORK

CROSS-REFERENCE TO RELATED APPLICATIONS

This application claims the benefit of U.S. Provisional Patent Application Ser. No. 63/539,549, filed Sep. 20, 2023, the content of which is incorporated herein by reference in its entirety.

FIELD OF THE DISCLOSURE

The present disclosure relates generally to artificial-intelligence (AI) systems, apparatuses, methods, and non-transitory computer-readable storage devices, and in particular to AI systems, methods, and non-transitory computer-readable storage devices for training of AI models using adaptive data-sampling.

BACKGROUND

Artificial-intelligence (AI) technologies are known. Generally, by using various AI models such as artificial neural networks (ANNs) widely used in machine learning (ML), AI technologies have greatly improved the functionality of computing devices (such as computers, "smart" devices, and/or the like) and computer systems.

Neural architecture search (NAS) is a method for automating the design of the architectures of ANNs. NAS improves neural network model design by replacing the manual trial-and-error process with an automatic search procedure, which has consequently improved the performance on, for example, many computer-vision tasks. However, since the underlying search space of architectures grows exponentially as a function of the architecture size, searching for an optimum neural architecture often requires extensive effort.

Therefore, there is a desire for an improved NAS method for generating ANNs with improved performances.

SUMMARY

According to one aspect of this disclosure, there is provided a first computerized method comprising: generating an input computational graph (CG) for representing a neural-network architecture, the input CG comprising one or more nodes each corresponding to an operation; and performing a plurality of optimization steps for at least one iteration to obtain a modified neural-network architecture represented by a modified CG for obtaining a neural network for use in one or more computing devices. The plurality of optimization steps comprise: identifying one or more subgraphs from the input CG, obtaining the modified CG by replacing the identified one or more subgraphs with one or more replacement subgraphs, respectively, evaluating one or more metrics of a modified neural-network architecture represented by the modified CG, and based on the evaluation, selecting the modified CG or the input CG. When the plurality of optimization steps are performed for a plurality of iterations, the selected CG obtained in one of the plurality of iterations is used as the input CG for a next one of the plurality of iterations.

In some embodiments, the first computerized method further comprises: adjusting a first relationship between one or more inputs of each replacement subgraph and one or more outputs of a first portion of the modified CG before the replaced segment thereof such that they match each other, and/or adjusting a second relationship between one or more outputs of each replacement subgraph and one or more inputs of a second portion of the modified CG after the replaced segment thereof such that they match each other.

In some embodiments, the first computerized method further comprises: using mixed-integer linear programming (MILP) to adjust a first relationship between one or more inputs of each replacement subgraph and one or more outputs of a first portion of the modified CG before the replaced segment thereof such that they match each other, and/or to adjust a second relationship between one or more outputs of each replacement subgraph and one or more inputs of a second portion of the modified CG after the replaced segment thereof such that they match each other.

In some embodiments, said evaluating the one or more metrics of the modified neural-network architecture represented by the modified CG comprises: evaluating the one or more metrics of the modified neural-network architecture represented by the modified CG under one or more constraints.

In some embodiments, said selecting the modified CG or the input CG comprises: using a Pareto frontier to select the modified CG or the input CG.

In some embodiments, said identifying the one or more subgraphs from the input CG comprises: for each node of the one or more nodes of the input CG, forming a triple therefor, the triple comprising the operation of the node, the operation of an incoming node thereof, and the operation of an outgoing node thereof, encoding each triple to a symbol to obtain a symbol sequence according to a node-traversing order; and identifying one or more substring by search the one or more subgraphs in the symbol sequence, each of the one or more substrings representing a respective one of the one or more subgraphs.

In some embodiments, the input CG is a directed acyclic graph (DAG) having a plurality of nodes and one or more directed edges each between a pair of the plurality of nodes; and the first computerized method further comprises: topologically indexing the input CG by assigning each node of the plurality of nodes of the input CG with an number such that for every directed edge from a node i of the plurality of nodes to a node j of the plurality of nodes, the number for the node i is less than the number for the node j, and such that the numbers assigned to the plurality of nodes form the node-traversing order.

In some embodiments, each of the identified one or more subgraphs and the corresponding one of the one or more replacement subgraphs have a same number of inputs and a same number of outputs.

In some embodiments, said evaluating one or more metrics of a modified neural-network architecture represented by the modified CG comprises: partitioning the modified CG into a segment partition comprising the one or more replacement subgraphs, a predecessor partition before the segment partition, and a successor partition after the segment partition; using a graph neural network (GNN) with each of the predecessor partition, the segment partition, and the successor partition as input thereof to compute a vector of a fixed length for each of the predecessor partition, the segment partition, and the successor partition; concatenating the vectors of the predecessor partition, the segment partition, and the successor partition to form a concatenated vector; and generating a performance estimate of the modified CG based on the concatenated vector.

In some embodiments, said generating the performance estimate of the modified CG based on the concatenated vector comprises: generating the performance estimate of the modified CG using a multi-layer perception (MLP) artificial neural network (ANN) with the concatenated vector as an input thereof.

According to one aspect of this disclosure, there is provided one or more circuits for performing the above-described first method.

According to one aspect of this disclosure, there is provided one or more non-transitory computer-readable storage devices comprising computer-executable instructions, wherein the instructions, when executed, cause a one or more circuits to perform the above-described first method.

According to one aspect of this disclosure, there is provided a second computerized method comprising: generating an input CG for representing a neural-network architecture, the input CG comprising one or more nodes each corresponding to an operation; for each node of the one or more nodes of the input CG, forming a triple therefor, the triple comprising the operation of the node, the operation of an incoming node thereof, and the operation of an outgoing node thereof, encoding each triple to a symbol to obtain a symbol sequence according to a node-traversing order; collecting one or more unique substrings from the symbol sequence; converting the collected substrings to the plurality of subgraphs; and storing the plurality of subgraphs for optimizing one or more target neural-network architecture.

In some embodiments, the input CG is a directed acyclic graph (DAG) having a plurality of nodes and one or more directed edges each between a pair of the plurality of nodes; and the second computerized method further comprises: topologically indexing the input CG by assigning each node of the plurality of nodes of the input CG with an number such that for every directed edge from a node i of the plurality of nodes to a node j of the plurality of nodes, the number for the node i is less than the number for the node j, and such that the numbers assigned to the plurality of nodes form the node-traversing order.

According to one aspect of this disclosure, there is provided one or more circuits for performing the above-described second method.

According to one aspect of this disclosure, there is provided one or more non-transitory computer-readable storage devices comprising computer-executable instructions, wherein the instructions, when executed, cause a one or more circuits to perform the above-described second method.

The above-described method, one or more circuits, and one or more non-transitory computer-readable storage devices have various benefits such as:

- The method disclosed herein provides search-space generalizability, enabling combination of information from different search spaces and operation of neural networks beyond these search spaces and across tasks.
- The method disclosed herein extracts segments with diverse characteristics in terms of size, topology, granularity, and/or the like. The method disclosed herein also provides improved efficiency.
- The predictor used in the method disclosed herein is aware of the location and the context of the subgraph replacement. The predictor used in the method disclosed herein is trained to be sensitive to changes within the neural network such as operation and resolutions mutations, thereby enabling ranking of neural architectures according to their performance with high accuracy.
- In computer vision applications, by using a resolution-propagation mixed-integer linear programming (MILP), the method disclosed herein is suitable for handing subgraphs with different resolutions corresponding to different parts of the neural network and with rigidly defined search spaces, thereby enabling combined subgraphs across search spaces, and utilization of knowledge between different neural architectural families. In other words, a subgraph mined from family X may contribute to performance of an architecture from family Y.
- The method disclosed herein provides robust optimization, and may optimize a performance metric while also optimizing a resource metric, wherein the selection of the performance and resource metrics may be flexible.

BRIEF DESCRIPTION OF THE DRAWINGS

For a more complete understanding of the disclosure, reference is made to the following description and accompanying drawings, in which:

FIG. 7 is a flowchart showing a first phase of an automatic graph optimization (AutoGO) method, according to some embodiments of this disclosure, wherein the first phase of the AutoGO method extracts one or more subgraphs from an input computational graph (CG) using a combination of a frequent subgraph mining (FSM) method and a byte-pair encoding (BPE) method;

FIG. 8A is a schematic diagram showing a simplified example of an input two-path CG processed by the first phase of the AutoGO method shown in FIG. 7, wherein the input CG comprises 12 nodes each corresponding to an operation;

FIG. 8B is a schematic diagram showing topological sorting of the input CG shown in FIG. 8A;

DETAILED DESCRIPTION

A. Artificial-Intelligence System

Artificial intelligence (AI) machines and systems usually comprise one or more AI models which may be trained using a large amount of relevant data for improving the precision of their perception, inference, and decision making.

Figure 1:
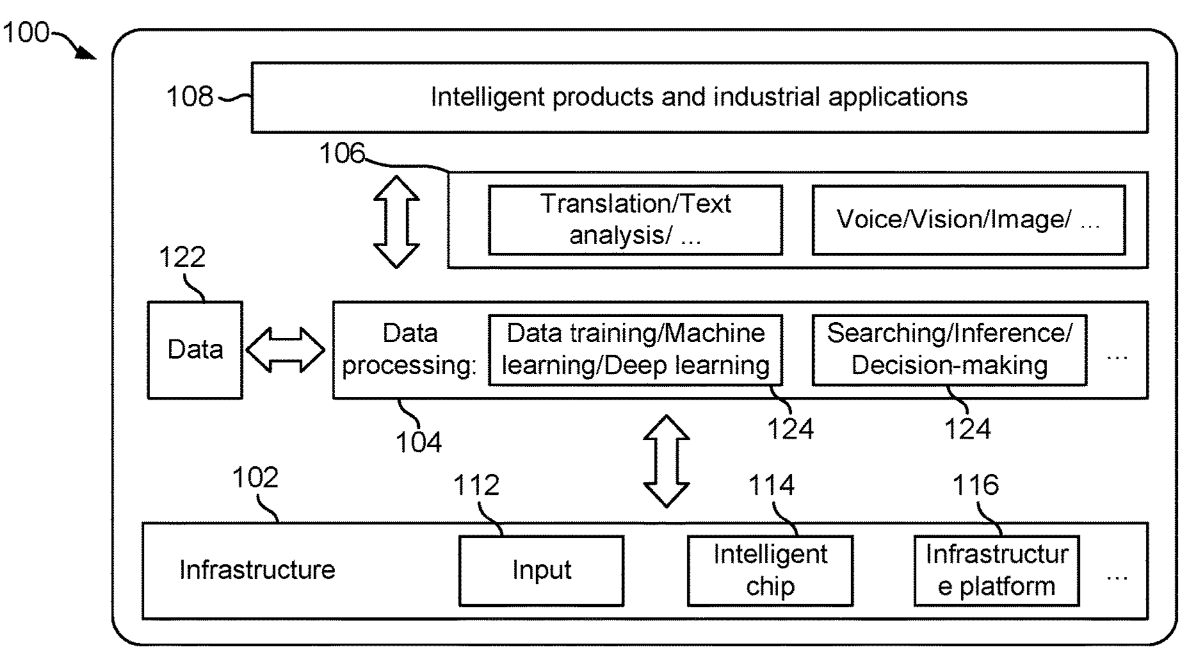
FIG. 1 is a simplified schematic diagram of an artificial intelligence (AI) system according to some embodiments of this disclosure.

Turning now to FIG. 1, an AI system for data-clone detection according to some embodiments of this disclosure is shown and is generally identified using reference numeral 100. The AI system 100 comprises an infrastructure layer 102 for providing hardware basis of the AI system 100, a data processing layer 104 for processing relevant data and providing various functionalities 106 as needed and/or implemented, and an application layer 108 for providing intelligent products and industrial applications.

The infrastructure layer 102 comprises necessary input components 112 such as sensors and/or other input devices for collecting input data, computational components 114 such as one or more intelligent chips, circuitries, and/or integrated chips (ICs), and/or the like for conducting necessary computations, and a suitable infrastructure platform 116 for AI tasks.

The one or more computational components 114 may be one or more central processing units (CPUs), one or more neural processing units (NPUs; which are processing units having specialized circuits for AI-related computations and logics), one or more graphic processing units (GPUs), one or more application-specific integrated circuits (ASICs), one or more field-programmable gate arrays (FPGAs), and/or the like, and may comprise necessary circuits for hardware acceleration.

The platform 116 may be a distributed computation framework with networking support, and may comprise cloud storage and computation, an interconnection network, and the like.

In FIG. 1, the data collected by the input components 112 are conceptually represented by the data-source block 122 which may comprise any suitable data such as sensor data (for example, data collected by Internet-of-Things (IoT) devices), service data, perception data (for example, forces, offsets, liquid levels, temperatures, humidities, and/or the like), and/or the like, and may be in any suitable forms such as figures, images, voice clips, video clips, text, and/or the like.

The data processing layer 104 comprises one or more programs and/or program modules 124 in the form of software, firmware, and/or hardware circuits for processing the data of the data-source block 122 for various purposes such as data training, machine learning, deep learning, searching, inference, decision making, and/or the like.

In machine learning and deep learning, symbolic and formalized intelligent information modeling, extraction, preprocessing, training, and the like may be performed on the data-source block 122.

Inference refers to a process of simulating an intelligent inference manner of a human being in a computer or an intelligent system, to perform machine thinking and resolve a problem by using formalized information based on an inference control policy. Typical functions are searching and matching.

Decision making refers to a process of making a decision after inference is performed on intelligent information. Generally, functions such as classification, sorting, and inferencing (or prediction) are provided.

With the programs and/or program modules 124, the data processing layer 104 generally provides various functionalities 106 such as translation, text analysis, computer-vision processing, voice recognition, image recognition, and/or the like.

With the functionalities 106, the AI system 100 may provide various intelligent products and industrial applications 108 in various fields, which may be packages of overall AI solutions for productizing intelligent information decisions and implementing applications. Examples of the application fields of the intelligent products and industrial applications may be intelligent manufacturing, intelligent transportation, intelligent home, intelligent healthcare, intelligent security, automated driving, safe city, intelligent terminal, and the like.

Figure 2:
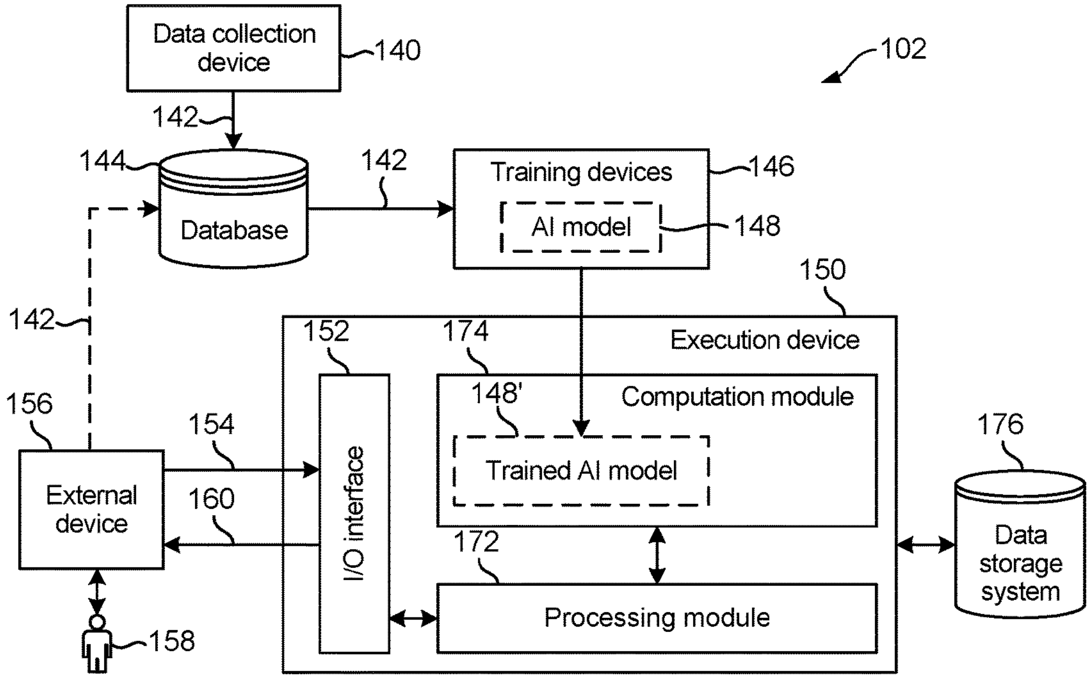
FIG. 2 is a schematic diagram showing the hardware structure of the infrastructure layer of the AI system shown in FIG. 1, according to some embodiments of this disclosure.

FIG. 2 is a schematic diagram showing the hardware structure of the infrastructure layer 102, according to some embodiments of this disclosure. As shown, the infrastructure layer 102 comprises a data collection device 140 for collecting training data 142 for training an AI model 148 (such as a machine-learning (ML) model, a neural network (NN) model (for example, a convolutional neural network (CNN) model), or the like) and storing the collected training data 142 into a training database 144. Herein, the training data 142 comprises a plurality of identified, annotated, or otherwise classified data samples that may be used for training (denoted "training samples" hereinafter) and their corresponding desired results (denoted "labels" hereinafter; that is, the target or desired predictions that the AI model 148 should make from the data samples). Herein the training samples may be any suitable data samples to be used for training the AI model 148, such as one or more annotated images, one or more annotated text samples, one or more annotated audio clips, one or more annotated video clips, one or more annotated numerical data samples, and/or the like. The desired results are ideal results expected to be obtained by processing the training samples by using the trained or optimized AI model 148'. One or more training devices 146 (such as one or more server computers forming the so-called "computer cloud" or simply the "cloud", and/or one or more client computing devices (also called "edge devices") similar to or same as the execution devices 150) train the AI model 148 using the training data 142 retrieved from the training database 144 to train the AI model 148 for use by the computation module 174 (described in more detail later).

As those skilled in the art will appreciate, in actual applications, the training data 142 maintained in the training database 144 may not necessarily be all collected by the data collection device 140, and may be received from other devices. Moreover, the training devices 146 may not necessarily perform training completely based on the training data 142 maintained in the training database 144 to obtain the trained AI model 148', and may obtain training data 142 from a cloud or another place to perform model training.

The trained AI model 148' obtained by the training devices 146 through training may be applied to various systems or devices such as an execution device 150 which may be an edge device such as a mobile phone terminal, a tablet computer, a notebook computer, an augmented reality (AR) device, a virtual reality (VR) device, a vehicle-mounted terminal, a server, or the like. The execution device 150 comprises an I/O interface 152 for receiving input data 154 from an external device 156 (such as input data provided by a user 158) and/or outputting results 160 to the external device 156. The external device 156 may also provide training data 142 to the training database 144. The execution device 150 may also use its I/O interface 152 for receiving input data 154 directly from the user 158.

The execution device 150 also comprises a processing module 172 for performing preprocessing based on the input data 154 received by the I/O interface 152. For example, in cases where the input data 154 comprises one or more images, the processing module 172 may perform image preprocessing such as image filtering, image enhancement, image smoothing, image restoration, and/or the like.

The processed data 142 is then sent to a computation module 174 which uses the trained AI model 148' to analyze the data received from the processing module 172 for prediction. As described above, the prediction results 160 may be output to the external device 156 via the I/O interface 152. Moreover, data 154 received by the execution device 150 and the prediction results 160 generated by the execution device 150 may be stored in a data storage system 176.

In the following, the AI model to be trained and the corresponding trained AI model are identified using the same reference numeral 148 for ease of description.

Figure 3:
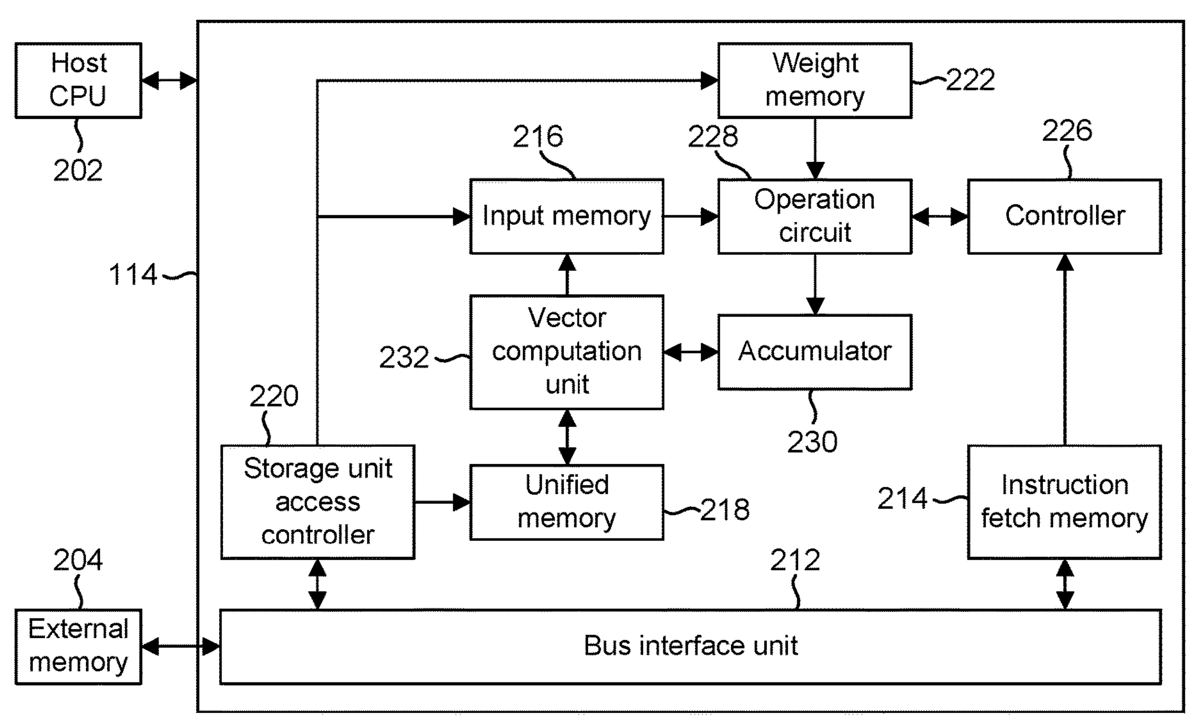
FIG. 3 is a schematic diagram showing the hardware structure of a chip of the AI system shown in FIG. 1, according to some embodiments of this disclosure.

FIG. 3 is a schematic diagram showing the hardware structure of a computational component 114 according to some embodiments of this disclosure. The computational component 114 may be any processor suitable for large-scale exclusive OR operation processing, for example, a convolutional NPU, a tensor processing unit (TPU), a GPU, or the like. The computational component 114 may be a part of the execution device 150 coupled to a host CPU 202 for use as the computational module 160 under the control of the host CPU 202. Alternatively, the computational component 114 may be in the training devices 146 to complete training work thereof and output the trained AI model 148.

As shown in FIG. 3, the computational component 114 is coupled to an external memory 204 via a bus interface unit (BIU) 212 for obtaining instructions and data (such as the input data 154 and weight data) therefrom. The instructions are transferred to an instruction fetch buffer 214. The input data 154 is transferred to an input memory 216 and a unified memory 218 via a storage-unit access controller (or a direct memory access controller, DMAC) 220, and the weight data is transferred to a weight memory 222 via the DMAC 220. In these embodiments, the instruction fetch buffer 214, the input memory 216, the unified memory 218, and the weight memory 222 are on-chip memories, and the input data 154 and the weight data may be organized in matrix forms (denoted "input matrix" and "weight matrix", respectively).

A controller 226 obtains the instructions from the instruction fetch buffer 214 and accordingly controls an operation circuit 228 to perform multiplications and additions using the input matrix from the input memory 216 and the weight matrix from the weight memory 222.

In some implementations, the operation circuit 228 comprises a plurality of processing engines (PEs; not shown). In some implementations, the operation circuit 228 is a two-dimensional systolic array. The operation circuit 228 may alternatively be a one-dimensional systolic array or another electronic circuit that may perform mathematical operations such as multiplication and addition. In some implementations, the operation circuit 228 is a general-purpose matrix processor.

For example, the operation circuit 228 may obtain an input matrix A (for example, a matrix representing an input image) from the input memory 216 and a weight matrix B (for example, a convolution kernel) from the weight memory 222, buffer the weight matrix B on each PE of the operation circuit 228, and then perform a matrix operation on the input matrix A and the weight matrix B. The partial or final computation result obtained by the operation circuit 228 is stored into an accumulator 230.

If required, the output of the operation circuit 228 stored in the accumulator 230 may be further processed by a vector calculation unit 232 such as vector multiplication, vector addition, an exponential operation, a logarithmic operation, size comparison, and/or the like. The vector calculation unit 232 may comprise a plurality of operation processing engines, and is mainly used for calculation at a non-convolutional layer or a fully connected layer (FC) of the CNN, and may specifically perform calculation in pooling, normalization, and the like. For example, the vector calculation unit 232 may apply a non-linear function to the output of the operation circuit 228, for example a vector of an accumulated value, to generate an active value. In some implementations, the vector calculation unit 232 generates a normalized value, a combined value, or both a normalized value and a combined value.

In some implementations, the vector calculation unit 232 stores a processed vector into the unified memory 218. In some implementations, the vector processed by the vector calculation unit 232 may be stored into the input memory 216 and then used as an active input of the operation circuit 228, for example, for use at a subsequent layer in the CNN.

The data output from the operation circuit 228 and/or the vector calculation unit 232 may be transferred to the external memory 204.

Figure 4:
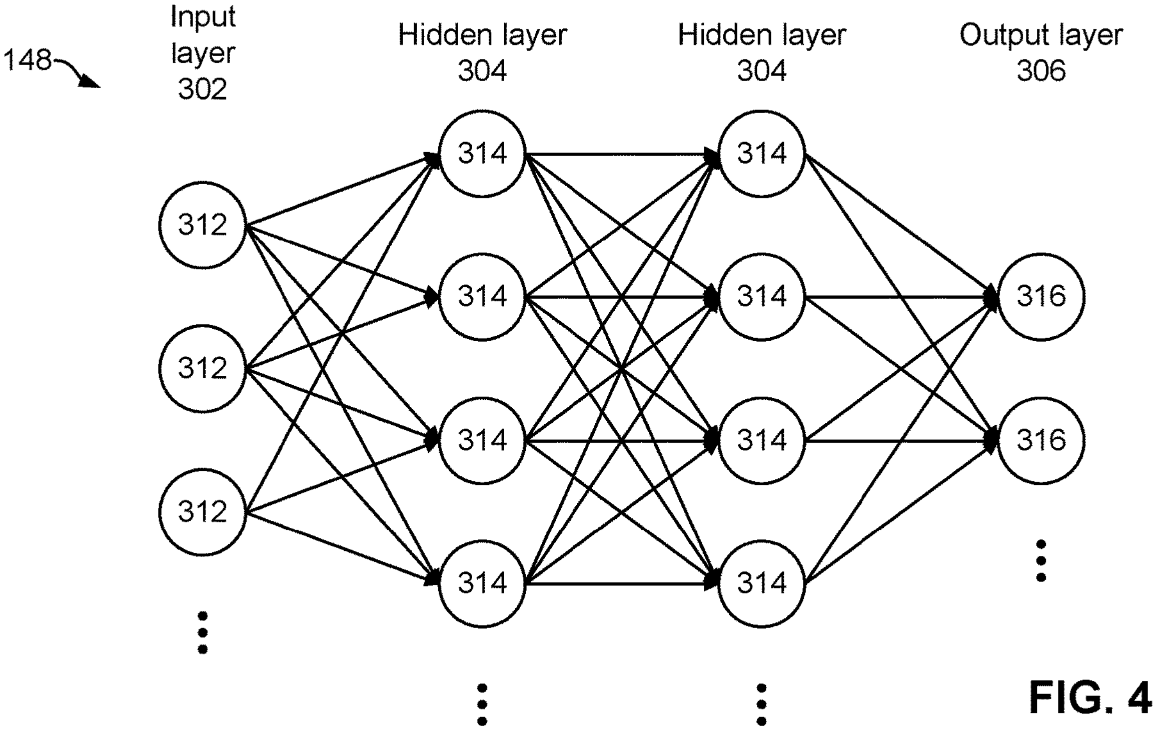
FIG. 4 is a schematic diagram of an AI model in the form of a deep neural network (DNN) used in the infrastructure layer shown in FIG. 2.

FIG. 4 is a schematic diagram of the AI model 148 in the form of a deep neural network (DNN; which is a sophisticated form of an artificial neural network (ANN). As shown, the DNN 148 comprises an input layer 302, a plurality of cascaded hidden layers 304, and an output layer 306. The trained AI model 148 may have a set of parameters optimized through the AI-model training.

The input layer 302 comprises a plurality of input nodes 312 for receiving input data and outputting the received data to the computation nodes 314 of the subsequent hidden layer 304. Each hidden layer 304 comprises a plurality of computation nodes 314. Each computation node 304 weights and combines the outputs of the input or computation nodes of the previous layer (that is, the input nodes 312 of the input layer 302 or the computation nodes 314 of the previous hidden layer 304, and each arrow representing a data transfer with a weight). The output layer 306 also comprises one or more output node 316, each of which combines the outputs of the computation nodes 314 of the last hidden layer 304 for generating the outputs 356.

As those skilled in the art will appreciate, the AI model such as the DNN 148 shown in FIG. 4 generally requires training for optimization. For example, a training device 146 (see FIG. 2) may provide training data 142 (which comprises a plurality of training samples with corresponding desired results) to the input nodes 312 to run through the AI model 148 and generate outputs from the output nodes 316. By comparing the outputs obtained from the output nodes 316 with the desired results in the training data 142, a lost function may be established and the parameters of the AI model 148, such as the weights thereof, may be optimized by minimizing the lost function.

B. Neural Architecture Search (NAS)

B-1. Conventional NAS Methods

As described above, neural architecture search (NAS) is a method for automating the design of the architectures of ANNs. A typical NAS method comprises a search phase and an evaluation phase. The search phase requires designing a fixed search space (which comprises a plurality of candidate neural architectures, candidate layers, and/or candidate nodes) and a search algorithm that traverses the fixed search space to discover high-performance architectures. In the evaluation phase, the discovered architectures need to be evaluated to confirm that the discovered architectures can indeed achieve high performance. The output of a NAS framework usually is a set of new neural network architectures (denoted "output neural network architectures") with high performance. In the following, the term "neural network" may also be simply denoted "network" and the term "neural network architecture" may also be simply denoted "neural architecture" for ease of description.

Search space design is the first, important step of the NAS method because the search space determines the possible neural network architectures that the NAS method may use for generating the output neural architectures. Without loss of generality and as an example, a typical CNN may contain multiple convolution operators, and the max number of convolution operators defines is an upper bound in their search space. Therefore, if the max number of convolution operators in any searched network is set to five (5), it would be impossible to find a CNN with six (6) convolutions. Other common searchable attributes for CNNs include the number of channels of each convolution operator, the kernel size of each convolution operator, connection patterns between different operators, and/or the like. Since the search space constrains the possible architectures, it also constrain the best possible performance. For example, a CNN found in a search space where at most five (5) convolutions are allowed could achieve at most 80% accuracy on some datasets compared to the CNN with six (6) convolutions.

Once the search space is determined, a sample-efficient search algorithm is designed. There are many types of search algorithms, including random search, sampling-based search, differentiable search and optimization (for example, DARTS, SNAS), Bayesian optimization (for example, NAS-BOT, BANANAS), genetic algorithms, and reinforcement learning (for example, ENAS, NASNet). While the search algorithms may be different on how fast they can find the best-performing architectures, these algorithms have to operate in the predefined search space. In other words, search algorithms are applied to manually constructed search spaces with predefined computational units. The granularity of these units ranges from simple primitive operations (such as convolutions, rectified linear unit (ReLU), pooling, and/or the like) to more complex blocks composed of multiple primitive operations (for example, the MBConv blocks used to construct MobileNetV2 and MobileNetV3 (a popular CNN family)). Further rules may be enforced on how a macro neural network is built on top of these operations or blocks by restricting their location and way of connection.

As described above, the search procedure may be started with a search space and a search algorithm or method, wherein the search method typically produces a set of new architectures. In conventional search methods, the high-performing architectures are selected via fully training and testing each new neural network on a desired dataset. However, such search methods are often costly. Most NAS methods rely on a proxy for faster performance evaluation, wherein a proxy may be a weight-sharing supernet trained before or during search, a performance predictor learned from labeled data, a score computed from network attributes, or partially training the network for a few epochs and then test it. The design of performance proxy is a popular subtopic under NAS, and is also important to the overall success of the search. Like the search algorithm, some performance proxy methods (for example, performance predictor) depend on the search space. Therefore, revising the search algorithm and re-design the performance proxy would be required if the search space is changed.

In conventional NAS methods, there is usually a single task of interest, for example, to find a new CNN with higher classification accuracy. In this case, classification accuracy alone determines which network is considered to be "high-performance". More recently, hardware-aware or hardware-friendly NAS methods allow for additional constraints such as model size, floating point operations (FLOPs), power, inference time, and the like, and aim to find high-performance architecture under certain constraints. Therefore, the searched architectures under hardware-dependent constraints are considered to be optimal for the underlying hardware.

Figure 5:
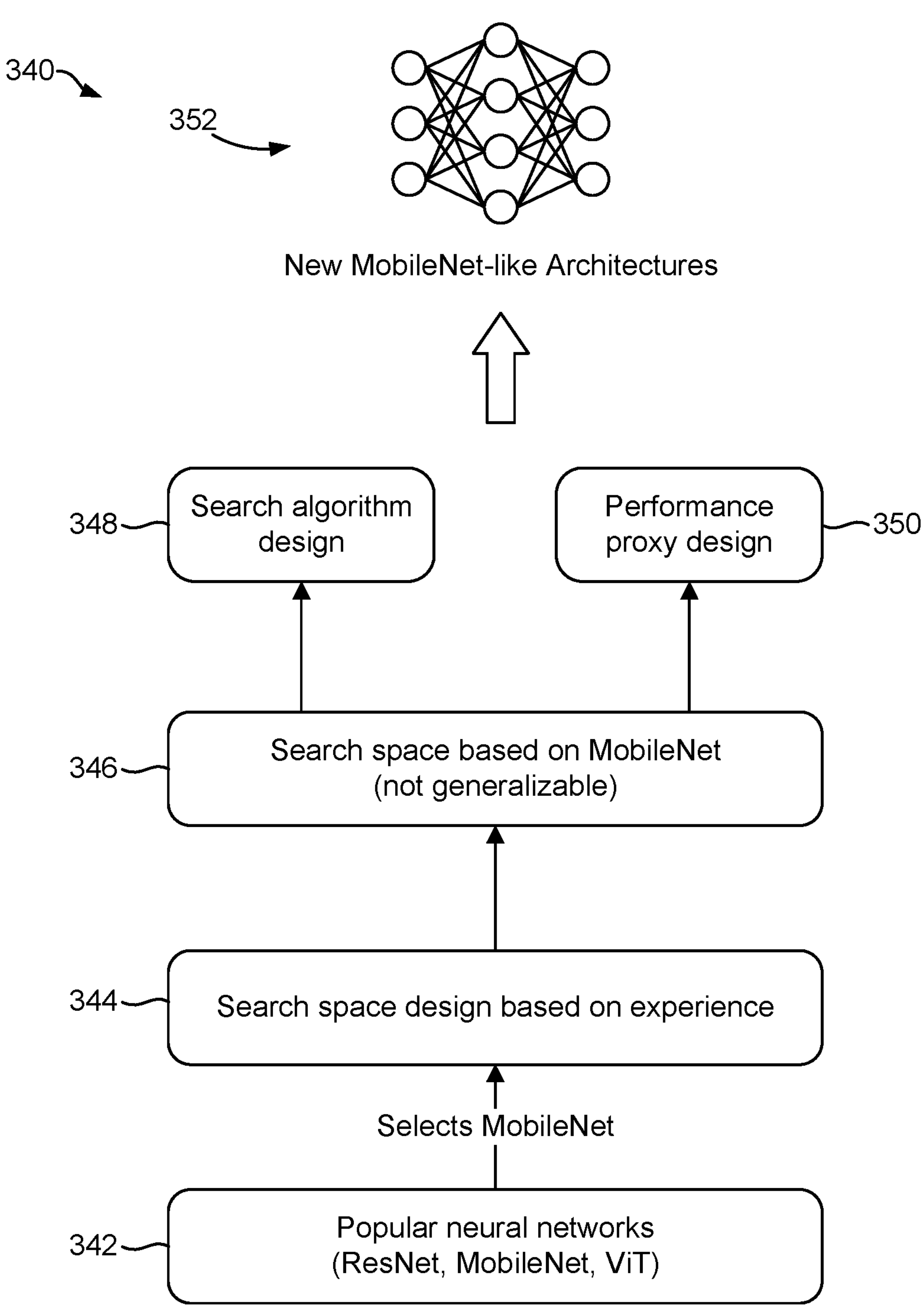
FIG. 5 is a schematic diagram showing the workflow of a conventional neural architecture search (NAS) method for designing new neural network architectures.

FIG. 5 is a schematic diagram showing the workflow 340 of a conventional NAS method for designing new neural network architectures. According to the workflow 340, one or more popular, handcrafted neural networks in literature are assessed, and a type of network with higher performance (or sufficiently high performance and lower computational cost) among the one or more neural networks is selected (block 342). In the example shown in FIG. 5, popular neural networks such as ResNet, MobileNet, and ViT are assessed, and MobileNet is selected due to its lightweight.

Then, a search space 346 is manually designed (block 344) using common MobileNet blocks, operators, network backbones, and topologies to obtain a search space based on MobileNet. Such a manual design of search space is generally based on experience, and the obtained search space is usually not generalizable.

In addition to the designed search space, a search algorithm and a performance proxy (blocks 348 and 350, respectively) are also designed, which may be used to discover new architectures 352 from the search space.

However, since the search space is originally inspired by and only contains MobileNet operators, the newly searched architectures would also be highly similar to MobileNets. In other words, searching in a search space inspired by MobileNet can only produce more MobileNet-like variants.

Thus, the conventional NAS methods have various disadvantages such as:

- Low generalizability. The design of search space (blocks 342 to 346) exhibits low generalizability. As described above, if one manually defines a search space around MobileNet, then the NAS method could only discover new architectures similar to MobileNet. If a better network family (for example, ViT) is later introduced, the NAS framework for MobileNet cannot be used to find architectures similar to the newly introduced network family. Therefore, the NAS framework has low generalizability to different network families. In order to find architectures similar to other neural networks (such as ViT), one has to re-design the search space, which is extremely inefficient.

- Limited transferability. Since the search space is manually designed, other modules in NAS, such as the performance proxy model designed at the block 350, often depends on the search space. Therefore, the performance proxy model for a first search space often cannot be directly transferred to a second search space. In other words, when one manually designs a new search space, a new performance proxy model often needs to be re-created, which makes NAS an unnecessarily labor-intensive task.
- Lack of support to the improvement of user-provided architectures. The conventional NAS methods finds new architectures from the pre-defined search space. However, in practice, the user of NAS frameworks often has a network and only wants to improve it. For example, a user may have already designed a performant CNN for a camera application and would like to use NAS to further optimize it with respect to specific hardware rather than incurring major changes to the CNN. Therefore, while it is preferable that the NAS framework take the user's neural network as an additional input to further tune and improve it rather than re-creating architectures from scratch, existing NAS methods cannot perform the desired neural-network tuning and improving.
- Extensive reliance on expert knowledge. The conventional NAS workflow 340 extensively relies on expert knowledge. For example, to manually design the search space around a network family such as ViT, one has to first become an expert of ViT. If no human expertise is available, it would be challenging to design a robust and efficient NAS framework.
- Lack of ability to leverage full advantage of existing frameworks. If one has already designed a NAS framework for MobileNet and would like to design another one for ViT using the conventional NAS workflow 340, he/she would have to repeat the workflow 340 shown in FIG. 1. It is challenging to directly share the search knowledge from one framework to another mainly due to the manually designed search spaces. For example, if the MobileNet NAS results suggest that channel size of 128 is always better, such a knowledge cannot be leveraged in designing ViT NAS framework without human intervention, which hinders the development of NAS.
- Limited hardware-awareness. If one designs a search space around MobileNet, the blocks/operators from MobileNet may only be friendly to specific hardware. Therefore, manually designed search spaces implicitly constrain the hardware friendliness.

B-2. Automatic Graph Optimization (AutoGO) Method for NAS

In the following, various embodiments are described for solving at least some of the above disadvantages.

In some embodiments, an automatic graph optimization (denoted "AutoGO") method may be used for NAS. The AutoGO method uses a plurality of benchmark neural architectures (denoted "benchmark NAS families") to optimize an input neural architecture, and leverages an evolutionary algorithm to improve the performance of the input neural architecture by iteratively mutating its computational units. An ANN is then built using the optimized neural architecture outputted from the AutoGO method for use by a computing device and/or a computer system.

The AutoGO method expands the scope of NAS from searching a fixed search pace of predefined blocks to incrementally optimizing and mutating a given input neural architecture in multiple dimensions (including operations and hyperparameters), and leveraging a database of algorithm-discovered useful subgraphs.

In these embodiments, the AutoGO method represents each of the benchmark neural architectures as a benchmark computational graph (CG). By using the benchmark CG as the low-level primitive representation of the neural network, the AutoGO method achieves generalizability and may operate and/or understand the structure of many neural networks from different search spaces and application tasks (such as computer-vision tasks). The AutoGO method optimizes the benchmark CGs by performing subgraph mutations.

Herein, a CG is a directed acyclic graph (DAG) representation of a neural network. As those skilled in the art understand, a DAG is a directed graph with no directed cycles. More specifically, the DAG consists of a plurality of vertices and one or more edges each directed from one vertex to another, such that traversing the edges along the directions thereof will never form a closed loop. In some examples, the CG of a neural network may be obtained using TensorFlow (TensorFlow is a software library for machine learning and artificial intelligence, developed by Google LLC of Mountain View, California, USA) or PyTorch (PyTorch is a machine learning framework provided by Meta AI of New York City, New York, USA and the Linux Foundation of San Francisco, California, USA).

Figure 6A:
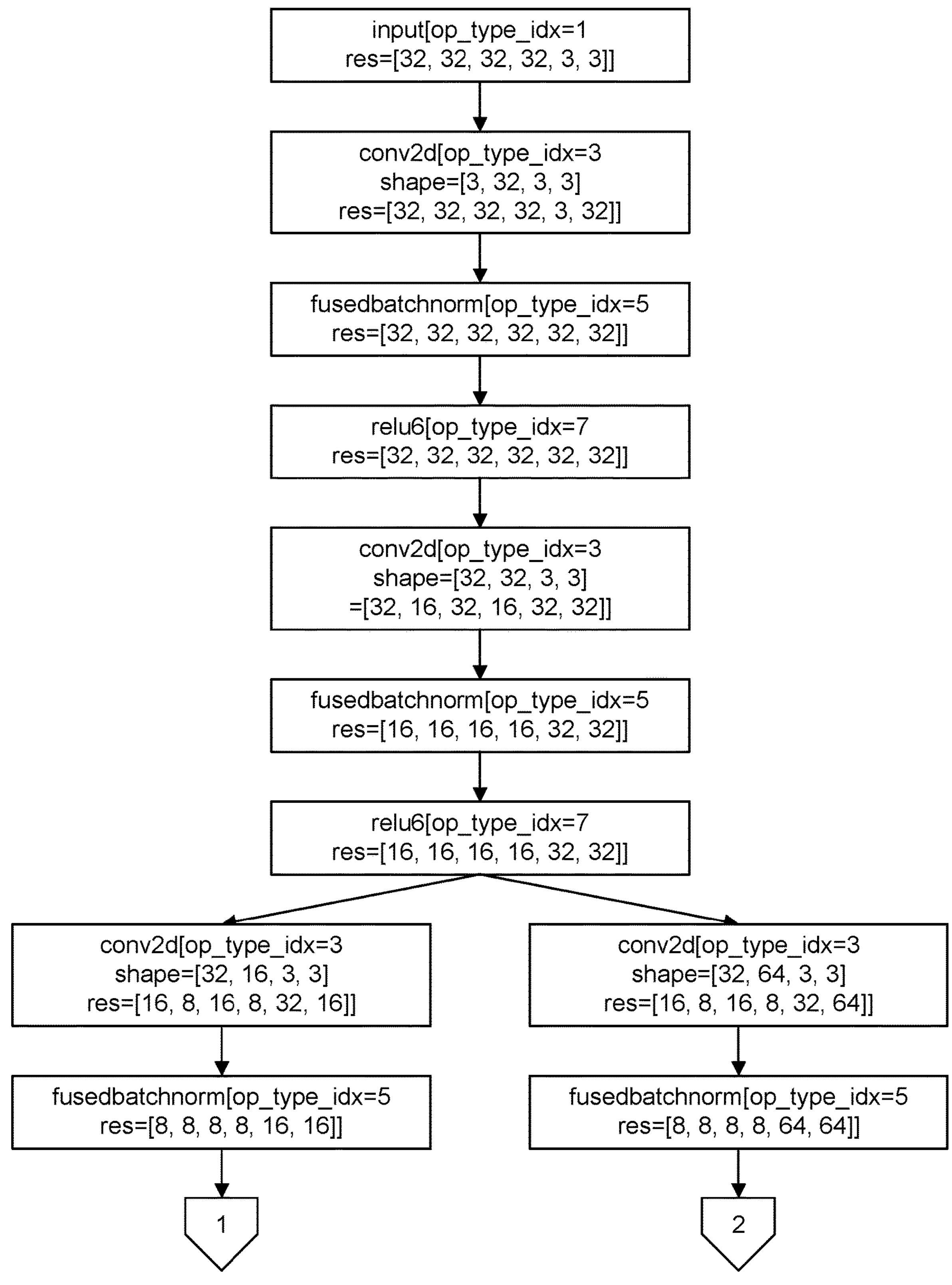
FIGS. 6A to 6C show an example of a computational graph with operation types and resolutions for a two-path convolutional neural network (CNN)
Figure 6B:
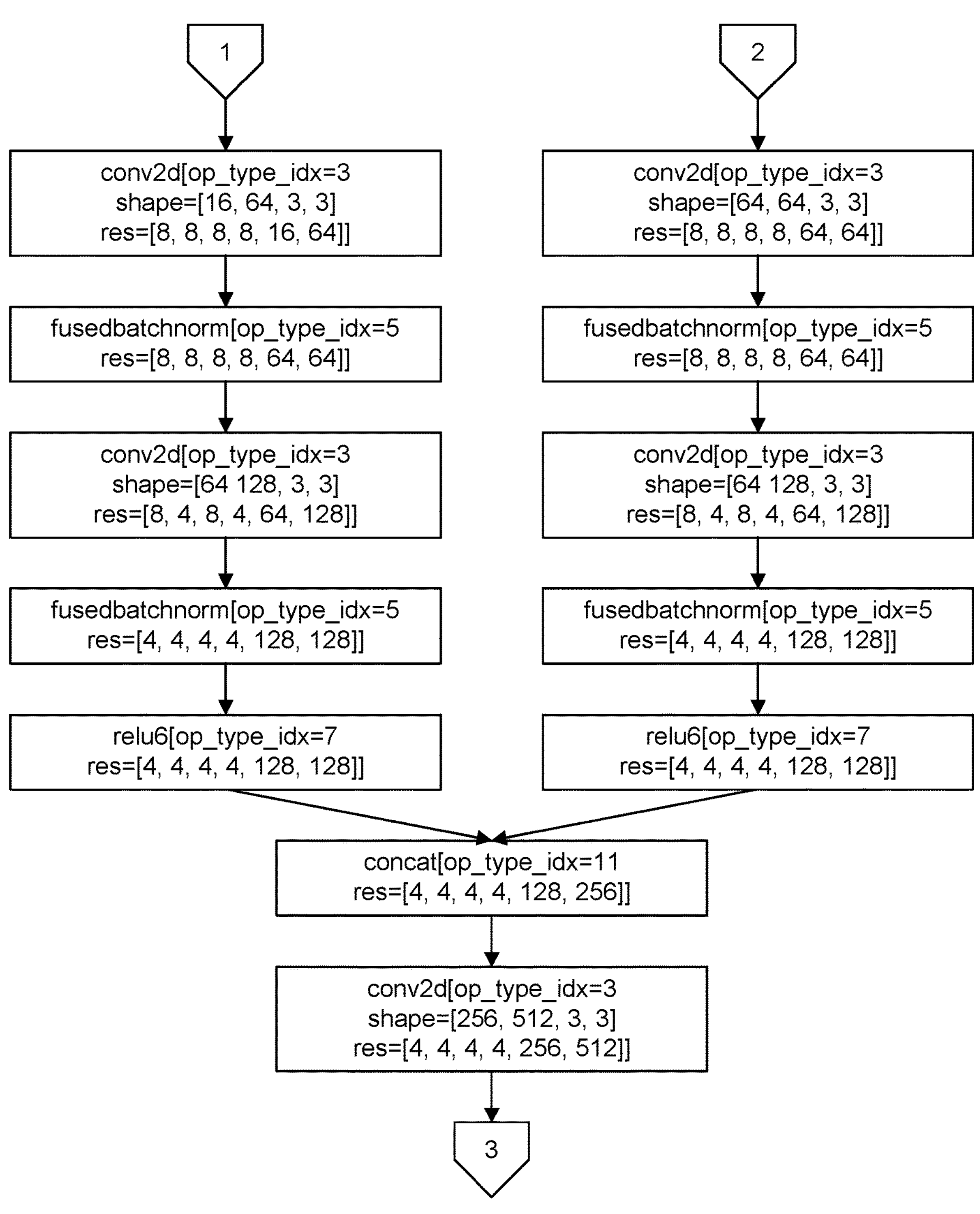
Figure 6C:
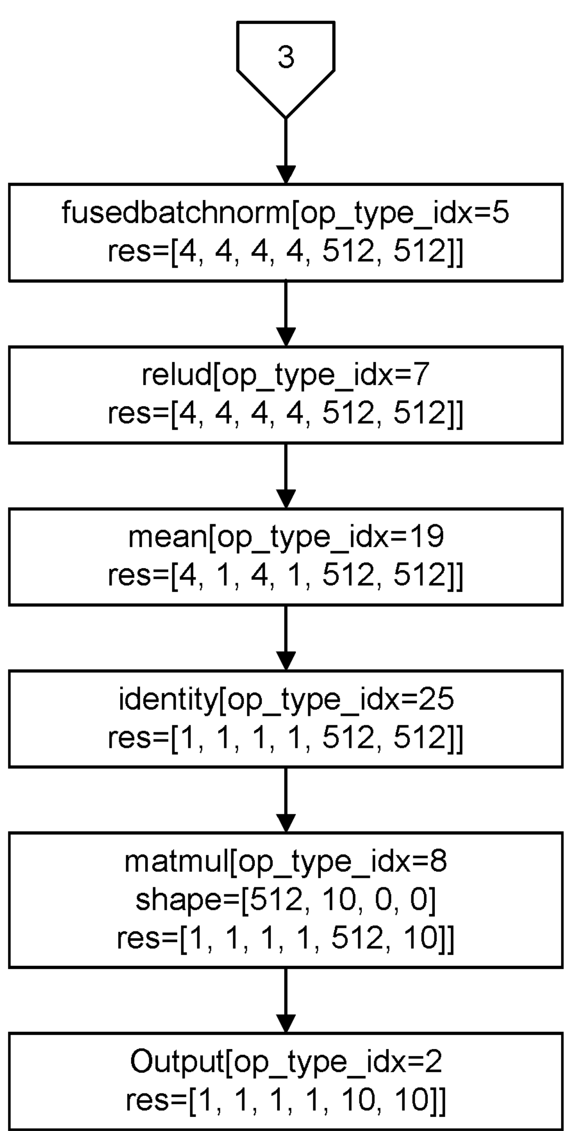

Each node of the CG corresponds to a "primitive" operation, or atomic unit of computation, for example, the operations defined in TensorFlow such as "conv2d" (a two-dimensional convolution operation), "fusedbatchnorm" (a fused batch normalization operation), "BN" (or "BatchNorm"; a batch normalization operation), and the like. Each node also comprises other necessary information. For example, when the neural network is for use in computer vision, each node may comprise information regarding the input and output tensor resolution such as height, width and channel sizes of the captured images. Edges of the CG describe the flow of information between nodes. FIGS. 6A to 6C (linked by the off-page references 1 to 3) show an example of a CG for computer-vision applications with operation types and resolutions for a two-path CNN. As those skilled in the art understand, in image processing and computer vision, the term "resolutions" of an image often refers to "height resolution", "width resolution", and "channel resolution". The terms "height resolution" and "width resolution" refer to the numbers of rows and columns of pixels of an image, respectively. The term "channel" refers to a set of aspects of an image (for example, in some embodiments, a color image may have red, green, and blue channels; in some other embodiments where a DNN is used for image processing and/or for computer-vision processing, an image may be 100 or more channels), and the term "channel resolution" refers to the number of the set of aspects of the image.

In these embodiments, the CG uses low-level primitive operators or operations as graph nodes. As those skilled in the art will appreciate, the low-level primitive operators or operations are the building blocks used to construct networks in any search space. Since primitive operators are common across search spaces, the CG may represent neural architectures from these search spaces universally and allows changes beyond the constraints imposed by expert knowledge and heuristics.

In some embodiments, the AutoGO method comprises two phases. In the first phase, the AutoGO method uses the benchmark CGs (corresponding to the benchmark neural architectures) to build a segment database comprising one or more candidate subgraphs. Herein, a subgraph is also denoted a "computational segment" or simply a "segment"). In the second phase, the AutoGO method uses the one or more candidate segments in the segment database to find and mutate one or more segments in an input CG (corresponding to a target neural architecture to be optimized). Those skilled in the art will appreciate that the segment database may be used to process a plurality of input CGs (by executing the second phase of the AutoGO method a plurality of times). The segment database may also be updated periodically, as needed, and/or as desired.

B-3. First Phase of the AutoGO Method

In the first phase, the AutoGO method uses the benchmark CGs (corresponding to the benchmark neural architectures) to build a segment database comprising one or more candidate segments.

In some embodiments, the first phase of the AutoGO method extracts one or more CG segments from the input CG 402 (which is a benchmark CG in the first iteration) using a combination of a FSM method and a BPE method.

In prior art, the FSM method is a method for finding "common" or "frequent" segments in a given graph (that is, segments appear more number of times than a predefined threshold value). More specifically, the FSM method finds or otherwise determines segments in the graph, and then calculates the support (that is, the number of appearances) of each of the segments. If the support of a segment is greater than a predefined threshold value, the segment is identified as a common segment.

In these embodiments, the AutoGO method combines the BPE method with the FSM method to mine or otherwise obtain a plurality of segments (denoted "candidate segments") from the input CG 402.

FIG. 7 is a flowchart showing the first phase 500 of the AutoGO method, according to some embodiments of this disclosure. For ease of illustration, FIG. 7 only shows the processing of one benchmark CG 402. Those skilled in the art will understand that the first phase of the AutoGO method shown in FIG. 7 may be repeatedly executed to process a plurality of benchmark CGs.

At step 502, the input CG (which is a DAG) is topologically indexed (also denoted "topologically sorted") to obtain a node-traversing order. Of course, those skilled in the art will appreciate that, in other embodiments, other suitable node-traversing order (such as a predefined node-traversing order) may be used. At step 504, the topologically sorted input CG is encoded into a symbol sequence in accordance with the node-traversing order. At step 506, a plurality of subsequences of the symbol sequence are identified. At step 508, the identified subsequences are reverted into subgraphs which are then stored into the segment database.

More specifically, at step 502, each node of the input CG is assigned with a numerical label or index such as an integer label or index, such that for every directed edge from node i to node j, the integer label for node i is less than the integer label for node j.

FIG. 8A is a schematic diagram showing a simplified example of an input two-path CG 542 comprising 12 nodes 552 to 574 each corresponding to an operation. By using topologically node sorting, each of the nodes 552 to 574 are associated with a respective integer label. FIG. 8B shows the input CG 542 after topological sorting. For ease of illustration, each of the nodes 552 to 574 is shown in the form of "<operation>-<integer label>". For example, the labelled node 552 is shown in FIG. 8B as "Conv-0". However, those skilled in the art will appreciate that any suitable methods (for example, using an array) may be used to associate an integer with a node.

Those skilled in the art will also appreciate that topological sorting is non-deterministic, meaning that one may perform topological sorting on the same DAG multiple times and obtain different labeling schemes, for example, there are multiple ways to label the nodes 556 to 560 ("Conv-2, BN-3, ReLU-4") and 562 to 566 ("Conv-5, BN-6, ReLU-7") in FIG. 8B. However, the label for node 554 ("ReLU") may always be "1" and the label for node 568 ("Add") may always be "8" in this example.

Those skilled in the art will further appreciate that the associated integer labels may be started with any integer (that is, not necessarily starting from "0"), and may not be consecutive.

Figure 9:
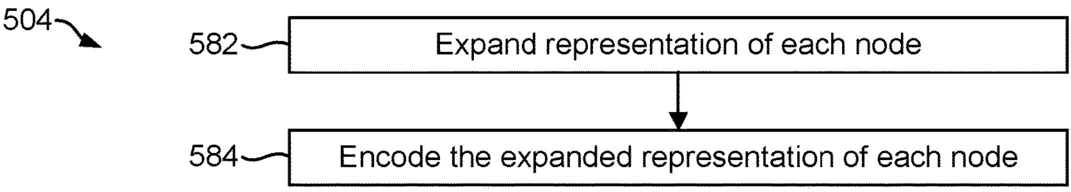
FIG. 9 is a flowchart showing the detail of the node-encoding step of the subgraph-extraction block shown in FIG. 7, according to some embodiments of this disclosure.

Referring back to FIG. 7, at step 504, each node in the input CG 542 is encoded in accordance with associated integer labels and with enriched labeling (with additional features) to convert the input CG 542 to a sequence. FIG. 9 is a flowchart showing the detail of step 504.

In these embodiments, each node of the input CG 542 is represented with the operation name thereof. At step 582, the representation of each node is enriched or otherwise expanded by including the context information of the node, such as the operations of the current, incoming, and outgoing nodes thereof, thereby forming a triple of [operation of current node, operation of incoming nodes, operation of outgoing nodes].

For example, node 552 (Conv) has no incoming node and has one outgoing node 554 (ReLU). Then, the enriched or expanded representation of node 552 is [Cony, N/A, ReLU], where N/A means "not available" and may be represented in any suitable manner (such as "NULL" or the like). As another example, node 568 (Add) has two incoming nodes 560 (ReLU) and 566 (ReLU), and one outgoing node 570 (Conv). Then, the enriched or expanded representation of node 568 is the triple of [Add, (ReLU, ReLU), Conv]. Those skilled in the art will appreciate that the operations in the triple may be arranged in any order in other embodiments (for example, as [incoming nodes, current node, outgoing nodes] in some embodiments, and the expanded representation of node 568 is the triple of [(ReLU, ReLU), Add, Conv]).

At step 584, the triple of each node is mapped or otherwise encoded to a unique symbol (such as a character symbol) such that the entire input CG 542 may be represented as a sequence of symbols.

In some embodiments, the triples are mapped to Chinese Unicode characters. Table 1 shows an example of encode each node of the CG 542 shown in FIGS. 8A and 8B. For ease of understanding, in Table 1, each node (in the first three columns) is shown in the form of "<operation name> (<reference numeral>)".

TABLE 1

Example of node encoding.

| Current node | Incoming nodes | Outgoing nodes | Node encoding |
|---|---|---|---|
| Conv (552) | N/A | ReLU (554) | 的 |
| ReLU (554) | Conv (552) | Conv (556), Conv (562) | 是 |

TABLE 1-continued

Example of node encoding.

| Current node | Incoming nodes | Outgoing nodes | Node encoding |
|---|---|---|---|
| Conv (556) | ReLU (554) | BN (558) | 不 |
| BN (558) | Conv (556) | ReLU (560) | 了 |
| ReLU (560) | BN (558) | Add (568) | 人 |
| Conv (562) | ReLU (554) | BN (564) | 不 |
| BN (564) | Conv (562) | ReLU (566) | 了 |
| ReLU (566) | BN (564) | Add (568) | 人 |
| Add (568) | ReLU (560), ReLU (566) | Conv (570) | 我 |
| Conv (570) | Add (568) | BN (572) | 在 |
| BN (572) | Conv (570) | ReLU (574) | 了 |
| ReLU (574) | BN (572) | N/A | 有 |

As can be seen from Table 1, the node encoding is conducted with an order in accordance with the integer labels of the nodes 552 to 574, while the integer labels are not used in encoding the nodes 552 to 574. Moreover, the references numerals shown in Table 1 are included for ease of identifying the nodes in FIGS. 9A and 9B, and they are not used in any aspect of node encoding.

Thus, the node encoding is generally based on the operation triple of each node, which means that some nodes may be encoded to a same symbol. For example, as the nodes 558, 564, and 572 have the same operation triple (that is, [BN, Conv, ReLU]), the nodes 558, 564, and 572 are then encoded to the same symbol "了". The CG 542 shown in FIGS. 8A and 8B is then encoded to a symbol sequence "的是不了人不了人我在了有".

As described above, at step 506 of the first phase 500 of the AutoGO method (see FIG. 7), a plurality of subsequences of the symbol sequence are identified. Herein, a subsequence (also denoted a "substring") is a unique portion of the symbol sequence, meaning that any two subsequences are different, and a same subsequence found in multiple locations of the symbol sequence will be counted as one subsequence with multiple appearance, rather than multiple subsequences. A subsequence corresponds to a subgraph, and a subsequence and the corresponding subgraph may be converted from one to the other). Herein, a subgraph or segment is a unique portion of the input CG 542, meaning that any two subgraphs are different, and a same segment found in multiple locations of the input CG 542 will be counted as one segment with multiple appearance, rather than multiple segments.

At step 506, the topologically sorted and encoded symbol sequence of the input CG 542 obtained at step 504 is used as a corpus of string for segment extraction, wherein a n-symbol substring (also denoted a "subsequence") of the symbol sequence corresponds to a n-node segment of the input CG 542 (n>0 is an integer).

At this step, a BPE method is used to find a plurality of substrings from the corpus of string (that is, the encoded symbol sequence of the input CG 542). As those skilled in the art understand, the BPE method is originally used for data compression and has been used in natural language processing (NLP) for text tokenization.

More specifically, the BPE method collects all single-symbol substrings (even if it only appears once) to cover all possible primitive (that is, single-node) operations that may appear, and adds collected single-symbol substrings to a vocabulary. The BPE method then iteratively collects multiple-symbol substrings from the corpus of string in accordance with the lengths (that is, the numbers of symbols) of substrings and/or the occurrences of the substrings in the symbol sequence. For example, the BPE method may collect the substrings in accordance with the increase of the substring lengths (that is, starting with collecting substrings of two symbols, then collecting substrings of three symbols, . . . ). When collecting the substrings of the same length, the BPE method may collect the substrings with the decrease of the numbers of occurrences thereof (that is, starting with collecting the "most frequent" or "most common" substring that has the highest number of occurrence, then collecting substrings of the next most frequent substring, . . . ). The collected multiple-symbol substrings are added to the vocabulary. After all substrings are collected and added to the vocabulary, the vocabulary is stored into the segment database.

In some embodiments, the vocabulary has a size limit (equivalently, the total number of collected substrings has a limit). In these embodiments, step 506 is terminated when the vocabulary (or the total number of collected substrings) reaches its limit.

Table 2 shows an example of some substrings extracted from the symbol sequence of the CG shown in FIGS. 8A and 8B, and the corresponding segments, wherein 11 substrings are listed including eight (8) one-symbol substrings (each corresponding to a one-node segment), two (2) two-node substrings (each corresponding to a two-node segment), and one (1) three-node substring (corresponding to a three-node segment).

TABLE 2

Encoded node string examples.

| Substring Type | Substrings | Segments |
|---|---|---|
| One-symbol substring | "的","是","不","了","人", "我","在","有" | [Conv, N/A, ReLU], [ReLU, Conv, (Conv, Conv)], [Conv, ReLU, BN], [BN, Conv, ReLU], [ReLU, BN, Add], [Add, (ReLU, ReLU), Conv], [Conv, Add, BN], [ReLU, BN, N/A] |
| Two-symbol substring | "不了","了人" | ([Conv, ReLU, BN], [BN, Conv, ReLU]), ([BN, Conv, ReLU], [ReLU, BN, Add]) |
| Three-symbol substring | "不了人" | ([Conv, ReLU, BN], [BN, Conv, ReLU], [ReLU, BN, Add]) |

In these embodiments, the identified substrings in the vocabulary are reverted into subgraphs at step 508 shown in FIG. 7, which are then stored into the segment database. The segment database may be utilized for two purposes. First, the segments in the database may be the units for segmenting the input or parent neural architectures in the second phase of the AutoGO method. Second, the segment database may be used as a repository of replacement subgraphs for replacing segments of an input CG during mutation.

Those skilled in the art will appreciate that, while in above embodiments, all substrings (or up to the vocabulary size limit) are identified for storage into the segment database, in some embodiments, any number of substrings may be identified (according to some specific rules) for storage into the segment database.

In some embodiments, the identified substrings in the vocabulary are not reverted into subgraphs at step 508. Rather, each identified substring is stored in the segment database with the information of the inputs and outputs of the corresponding subgraph.

As those skilled in the art understand, conventional FSM methods suffer from the expensive calculation of subgraph isomorphism, long run time, and memory inefficiency when extracting and storing subgraphs. By topologically sorting the input CG and enriching its labels, the first phase of the AutoGO method relaxes the subgraph isomorphism calculation problem into mining segments from sequences instead of mining from graphs. Pattern extraction techniques enjoy efficient runtime and memory consumption over sequences. It is computationally easier to perform FSM using BPE on a large corpus of character strings, for example, by using optimized open-source frameworks.

B4. Second Phase of the AutoGO Method

Figure 10A:
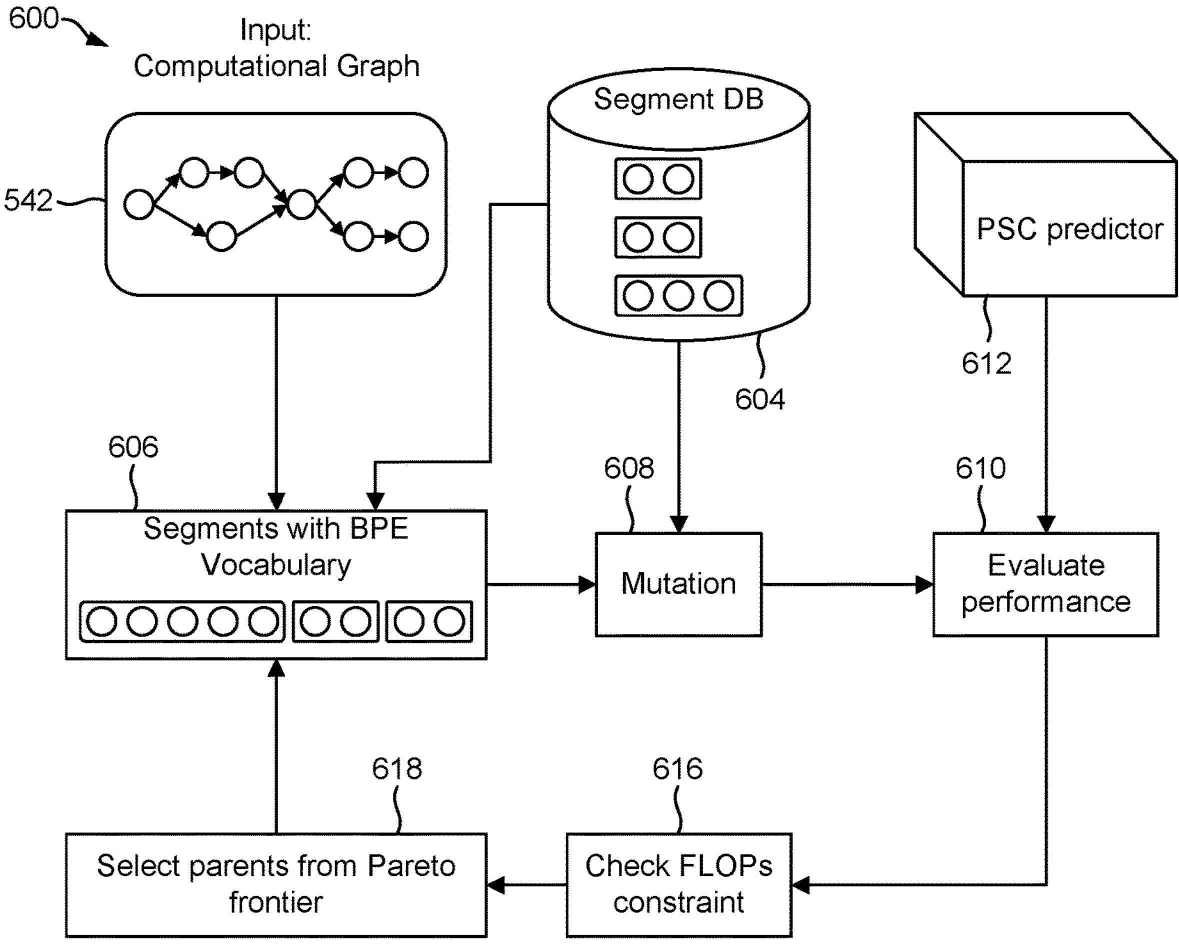
FIG. 10A is a schematic diagram showing a workflow of a second phase of the AutoGO method, according to some embodiments of this disclosure.

In the second phase, the AutoGO method optimizes an input neural architecture by using mutation. FIG. 10A is a schematic diagram showing a workflow 600 of the second phase of the AutoGO method, according to some embodiments of this disclosure. For ease of illustration, FIG. 7 only shows one iteration of the processing of one benchmark CG 402. Those skilled in the art will appreciate that the AutoGO method shown in FIG. 10A may be executed for one iteration, or iteratively executed for a plurality of iteration. In each iteration, the input CG (being a target CG to be optimized for the first iteration or the CG outputted from the previous iteration) may be denoted a "parent CG" of the output CG (and corresponding, the input neural architecture being a parent neural architecture of the output neural architecture), and the output CG may be denoted a "child CG" of the input CG (and corresponding, the output neural architecture being a child neural architecture of the input neural architecture).

As shown, the input neural architecture is represented as an input CG 542, which is topologically sorted, labelled, and encoded into a symbol sequence or string (similar to steps 502 and 504 shown in FIG. 7).

Then, the segment database 600 is used to identify one or more segments 606 in the input CG 542. For example, the second phase of the AutoGO method may select (via, for example, random selection, or other suitable selection methods such as selection according to a predefine rule) a segment (or more specifically, the substring corresponding to the segment) from the segment database 600 and then search the selected segment in the input CG 542. The second phase of the AutoGO method may repeat the select and search steps to identify a plurality of segments 606 in the input CG 542.

At block 608, the identified one or more segments are used as the computational units for mutation to obtain a modified CG (and therefor a modified neural architecture), wherein each of the identified one or more segments 606 is replaced with a respective replacement segment having the same number of inputs and same number of outputs.

At block 610, the performance of the modified CG (in other words, the modified neural architecture) is evaluated.

In prior art, the performance of a neural architecture or a neural network may be evaluated using a neural predictor or the like. However, most prior-art performance-evaluation methods rely upon expert rules and assumptions and cannot capture the details in a CG and thus cannot be used for segment-level mutation.

In these embodiments, a predecessor, segment, successor (PSC) predictor 612 is used at block 610 to estimate the change in performance between the modified CG and the input CG 542 that results from mutating one or more identified segments in the CG 542. The PSC predictor 612 is sensitive to the location of the identified segment within the overall neural network and the context thereof, and encodes important details such as tensor resolution. The modified CG is kept or otherwise selected if the performance thereof is improved comparing to that of the input CG 612; otherwise, the modified CG is discarded and the input CG 612 is kept or selected.

In some embodiments, the AutoGO method may optimize the neural architecture based on multiple objectives. For example, in some embodiments, some objective metrics such as FLOPs do not require elaborate estimation mechanisms to measure, and may be used as constraints to limit the changes that the AutoGO method may make to an architecture into predefined bounds (block 616).

In some embodiments, the AutoGO method may further use a Pareto frontier to construct a neural architecture that best fits across multiple objectives (block 618). As those skilled in the art understand, in multi-objective optimization, the Pareto frontier is the set of all Pareto efficient solutions which represents the best trade-off between all the objective functions (that is, no action or allocation is available that makes one objective better without making another objective worse).

The selected CG (being the modified CG or the input CG 542 depending on their performance comparison) may be used as the input CG for another iteration of optimization as described above.

Figure 10B:
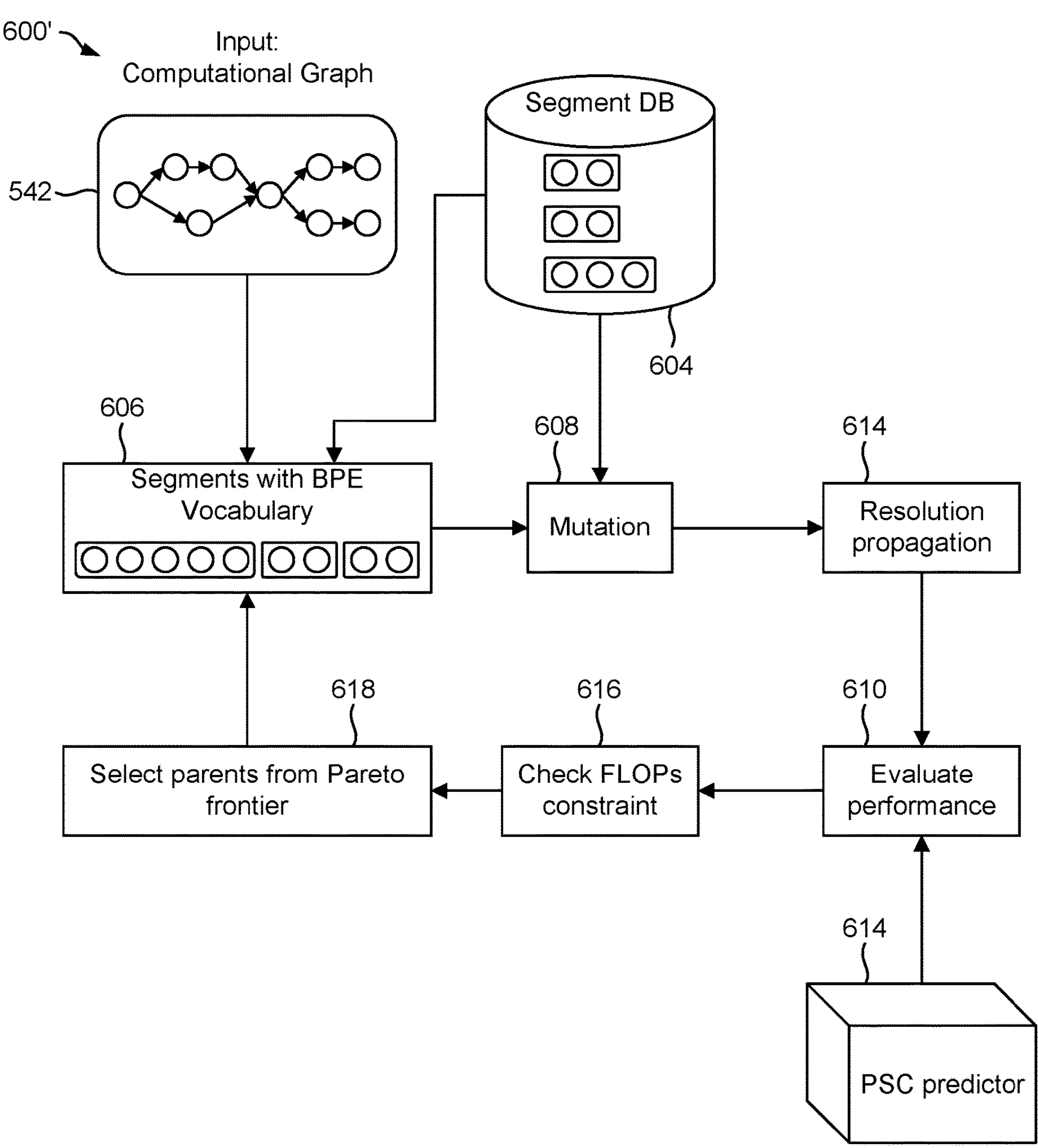
FIG. 10B is a schematic diagram showing a workflow of the second phase of the AutoGO method, according to yet some embodiments of this disclosure.

FIG. 10B is a schematic diagram showing a workflow 600' of the second phase of the AutoGO method, according to yet some embodiments of this disclosure. The workflow 600' shown in FIG. 10B is similar to the workflow 600 shown in FIG. 10A, and in these two figures, the blocks having same reference numerals are the same. Therefore, the description below only focuses on the block 614 in FIG. 10B.

As described above, the mutation block 608 generates a modified CG (corresponding to a modified neural architecture). Then, the AutoGO method may update the modified neural architecture (block 614) as needed to maintain the correctness thereof. Such an update may include adjusting the relationship between the outputs of the predecessor portion of the modified CG (that is, the portion of the modified CG before the replaced segment) and the inputs of the replaced segment such that they may match each other as required, and adjusting the relationship between the outputs of the replaced segment and the inputs of the successor portion of the modified CG (that is, the portion of the modified CG after the mutant segment) such that they may match each other as required. For example, in computer-vision applications, the AutoGO method may update the modified neural architecture to propagate the resolutions from the predecessor portion of the modified CG through the replaced segment to the successor portion of the modified CG (described in more detail later).

B-5. Performance Estimate Using PSC Predictor

In some embodiments, each of the input CG 542 and the modified CG is first partitioned into a PSC format; and then a PSC predictor 612 is used at block 610 to estimate the change in performance between the input CG 542 and the modified CG that results from mutating one or more segments in the input CG 542.

Figures 11A, 11B:
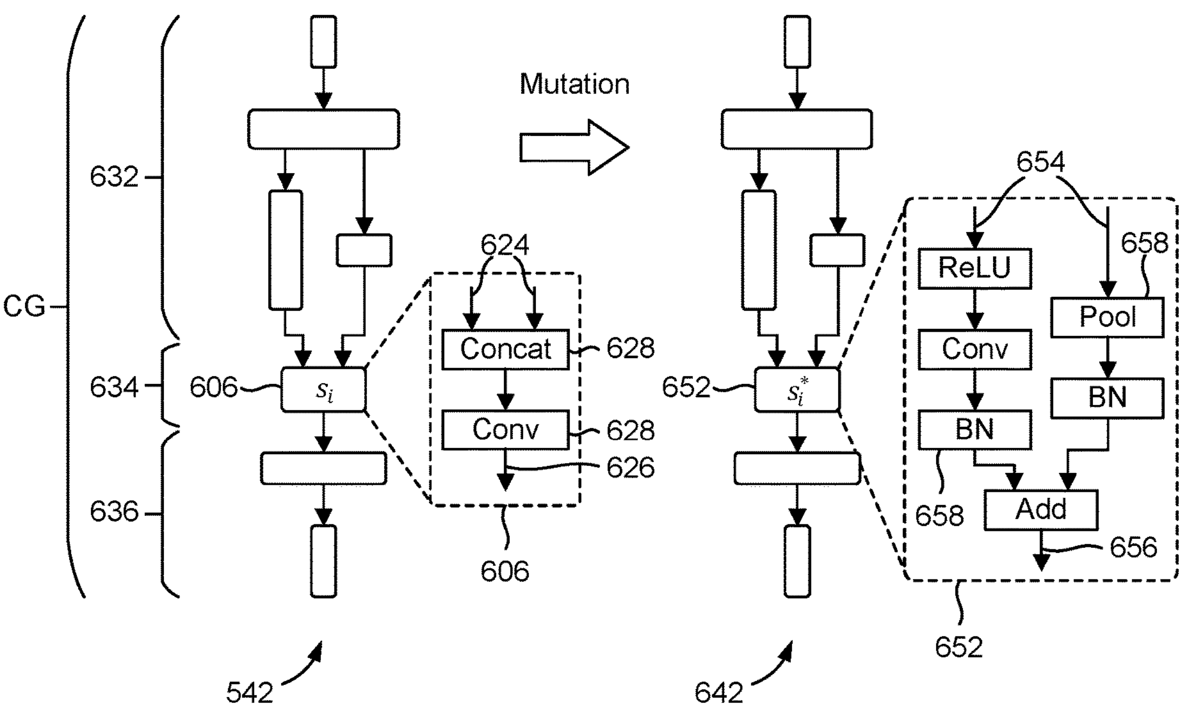
FIG. 11A is a schematic diagram showing the partitioning of an input CG, according to yet some embodiments of this disclosure.
FIG. 11B is a schematic diagram showing the modified CG obtained from the input CG shown in FIG. 11A by replacing an identified segment with a replacement segment, according to yet some embodiments of this disclosure.

FIG. 11A is a schematic diagram showing the partitioning of the input CG 542, wherein the round-corner rectangles represent various segments. For ease of illustration, FIG. 11A only shows a single segment 606 (also denoted a segment $s_i$) being identified for replacement. In this example, the segment 606 comprises two inputs 624, one output 626, and a plurality of operations 628.

FIG. 11B shows the modified CG 642 obtained from the input CG 542 by replacing the identified segment 606 with a replacement segment 652 (also denoted a segment $s_i$*) having two inputs 654, one output 656, and a plurality of operations 658. The replacement segment 652 has the same number of inputs and same number of outputs as those of the segment 606 to be replaced. However, the replacement segment 652 may have different operations 658 compared to the operations 628 of the identified segment 606. Moreover, the replacement segment 652 may be a segment extracted from a neural network that is completely different from the input CG 542.

As described above, after a segment mutation or replacement, a PSC predictor 412 is used for estimating the performance of the modified CG 642 (or more precisely, the neural architecture corresponding to the modified CG 642). For this purpose, each of the input CG 542 and the modified CG 642 is partitioned into a PSC format. More specifically, before segment mutation, the segments of the input CG 542 are grouped into three partitions: a predecessor partition 632 including all segments before the identified segment 606, a segment partition 634 including the identified segment 606, and a successor partition 636 including all segments after the identified segment 606. After segment mutation, the segments of the modified CG 642 are also grouped into three partitions: a predecessor partition 632 including all segments before the segment 652, a segment partition 634 including the segment 652, and a successor partition 636 including all segments after the segment 652.

Then, the PSC formats of the input CG 542 and the modified CG 642 are used to estimate the performance difference caused by replacing $s_i$ with $s_i$*. The PSC predictor 412 estimates the performance $y_i$ of the input CG 542 as:

$$h_P = GNN(P);\ h_{s_i} = GNN(s_i);\ h_C = GNN(C) \tag{1}$$

$$y_i = MLP(\text{Concatenate}[h_P, h_{s_i}, h_C]) \tag{2}$$

where

P represents the predecessor partition 632 and C represents the successor partition 636;

GNN(X) represents a graph neural network which takes a CG (whole or subgraph) X as input (X may be P, $s_i$, or C in Equation (1)) and computes a vector $h_p$ of fixed length d, that is, GNN: $CG \rightarrow h_{CG} \in \mathbb{R}^d$, MLP (X) represents a multi-layer perception ANN which receives a vector Y and maps the vector Y to a prediction y; MLP: $h^* \rightarrow y^* \in \mathbb{R}$ (as those skilled in the art understand, a MLP is a feedforward ANN for generating a set of outputs from a set of inputs; an MLP is characterized by several layers of input nodes connected as a directed graph between the input and output layers), and Concatenate[$Z_1$, $Z_2$, . . . ] represents the concatenation operation on the inputs $Z_1$, $Z_2$, . . . which outputs the concatenation of $Z_1$, $Z_2$, . . . . In Equation (2), the concatenation operation combines the three $h^* \in \mathbb{R}^d$ into a longer vector $h_{PSC} \in \mathbb{R}^{3d}$.

In other words, the PSC predictor 612 uses the GNN with each of the predecessor partition 632, the segment partition 634, and the successor partition 636 of the input CG 542 as input thereof to compute a vector of a fixed length for each of the predecessor partition 632, the segment partition 634, and the successor partition 636 of the input CG 542. Then, the PSC predictor 612 concatenates the vectors of the predecessor partition 632, the segment partition 634, and the successor partition 636 to form a concatenated vector, and generates a performance estimate of the input CG 542 based on the concatenated vector (for example, by using a MLP ANN with the concatenated vector as an input thereof).

Likewise, the performance $y_i$* of the modified CG 642 may be estimated as:

$$h_P = GNN(P);\ h_{s_i^*} = GNN(s_i^*);\ h_C = GNN(C) \tag{3}$$

$$y_i^* = MLP(\text{Concatenate}[h_P, h_{s_i^*}, h_R]) \tag{4}$$

wherein P and C in equation (3) represent the predecessor partition 632 and the successor partition 636 of the modified CG 642.

In other words, the PSC predictor 612 uses the GNN with each of the predecessor partition 632, the segment partition 634, and the successor partition 636 of the modified CG 642 as input thereof to compute a vector of a fixed length for each of the predecessor partition 632, the segment partition 634, and the successor partition 636 of the modified CG 642. Then, the PSC predictor 612 concatenates the vectors of the predecessor partition 632, the segment partition 634, and the successor partition 636 of the modified CG 642 to form a concatenated vector, and generates a performance estimate of the modified CG 642 based on the concatenated vector (for example, by using a MLP ANN with the concatenated vector as an input thereof).

The estimated performances $y_i$ and $y_i$* are then compared to determine if and how much the performance of the input CG 542 is improved by this segment mutation (that is, by replacing $s_i$ with $s_i$*).

In some embodiments, one or more segment mutations may be tested and the best segment mutation (that is, the segment mutation giving rise to the largest performance improvement) is selected and outputted from block 610. When multiple segment mutations are tested, at least some of the multiple segment mutations may each be replacing a same segment with a different replacement segment, and/or at least some of the multiple segment mutations may each be replacing a different segment with a different or same replacement segment.

The above-described PSC format allows for granular changes, for example, changing one small part of the neural architecture. Such a PSC format improves the sensitivity of the PSC predictor to small changes, allowing it to be aware of the mutation location and its context (predecessor and successor). Moreover, the PSC format builds upon above-described CG network representation, by encoding important details such as tensor dimensions and operation weight dimensions.

B-6. Mixed-Integer Linear Programming (MILP) for Resolution Propagation

As described above, the AutoGO method uses FSM and BPE to mine subgraphs from different architecture families. The mined subgraphs differ with respect to topologies and node names (that is, operations). The mining process does not take into account the features of the operations, such as the tensor height, width, and channel resolutions in computer-vision applications, which may vary significantly across search spaces and individual networks.

When optimizing an input CG 402 by mutating segments, the AutoGO method uses a constraint that the segment to be replaced and the replacement segment have the same number of inputs and same number of outputs. However, there may exist mismatch in the inputs/outputs of the predecessor portion, predecessor portion, and the successor portion. In other words, the outputs of the predecessor portion of the modified CG may not match (that is, may not meet the requirements of) the inputs of the replacement segment, and the outputs of the replacement segment may not meet the requirements of the inputs of the successor portion of the modified CG. Therefore, an extra step (block 614 in FIG. 10B) may be required to maintain the correctness of the child neural network (that is, the neural network corresponding to the modified CG) after mutation.

For example, when the neural network is for use in computer vision, the set of (height, width, channel) resolutions of the outputs of the predecessor portion of the modified CG may not meet the required set of (height, width, channel) resolutions of the inputs of the replacement segment, and the set of (height, width, channel) resolutions of the outputs of the replacement segment may not meet the required set of (height, width, channel) resolutions of the inputs of the successor portion of the modified CG.

Figure 12:
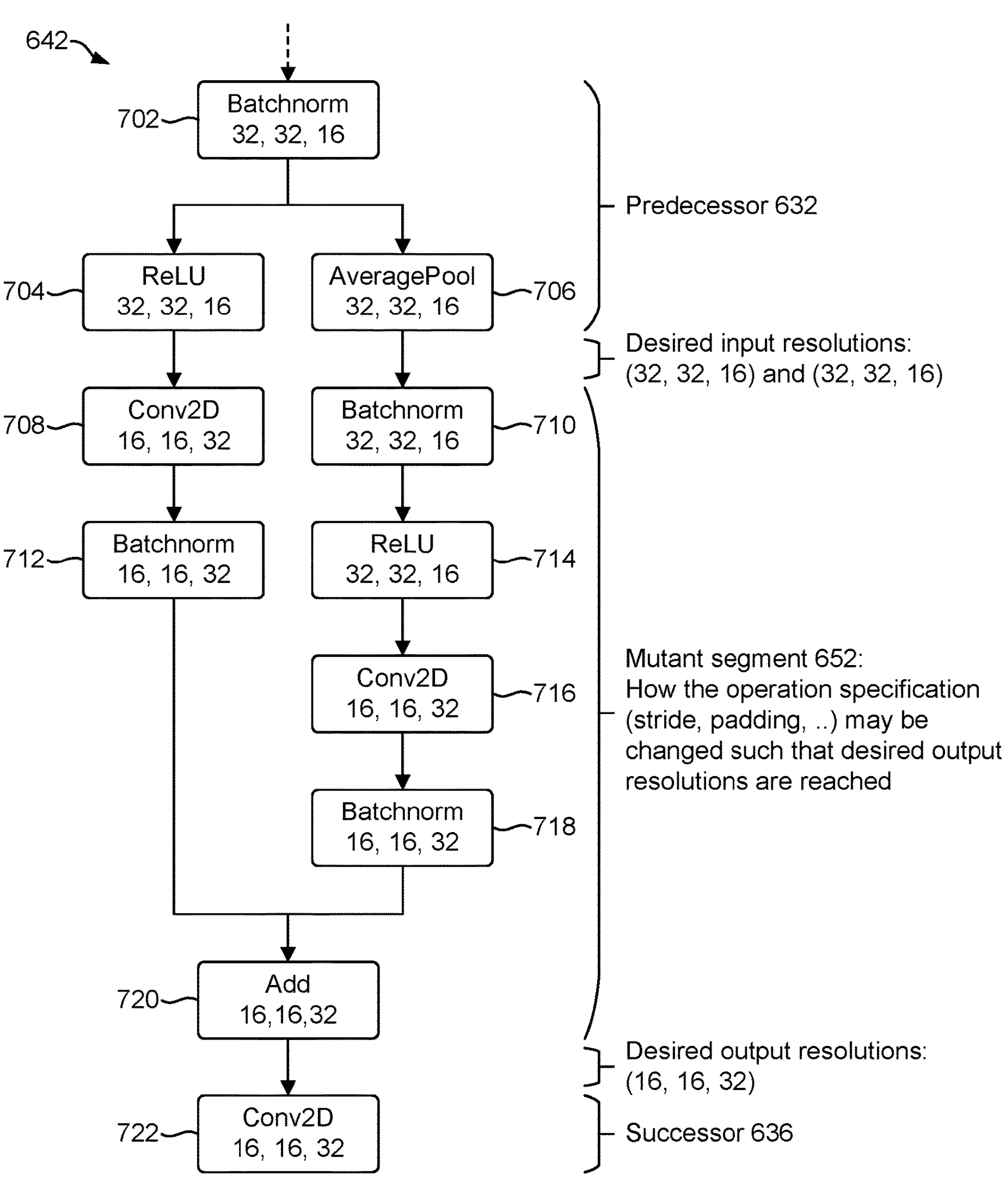
FIG. 12 is a schematic diagram showing a portion of a modified CG for illustration of resolution propagation.

FIG. 12 is a schematic diagram showing a portion of a modified CG 642 for illustration of resolution mismatch issue. The portion of the modified CG 642 has two paths and comprises nodes 702 to 706 belonging to the predecessor partition 622, a replacement segment 624 having nodes 708 to 720, and a successor partition 626 having a node 722. The output resolution of each operation (that is, each node) is in the form of (h, w, c).

The replacement segment 652 requires the input dimension sizes thereof (for the Conv and BN operations of its input nodes 708 and 710, respectively) to be (32, 32, 16), which are the resolutions of the output nodes 704 and 706 of the predecessor partition 622. Also, the successor partition 626 requires the input dimension sizes thereof to be (16, 16, 32), which requires the replacement segment 624 to output a feature map with such input dimension sizes at the output node 720 (the Add operation).

Thus, in some embodiments, the AutoGO method may adjust the relationship between the outputs of the predecessor portion 632 of the modified CG 642 and the inputs of the replaced segment 652 such that they may match each other as required, and adjust the relationship between the outputs of the replaced segment 652 and the inputs of the successor portion 636 of the modified CG 642 such that they may match each other as required. For example, in computer-vision applications, the AutoGO method may maintain the correctness of the neural network after mutation by having a suitable set of (height, width, channel) resolutions propagated from the predecessor portion 632 of the modified CG 642 into the replacement segment 652 of the modified CG 642, and then to the successor portion 636 of the modified CG 642.

In the following description, some variables are used, including:

h: Tensor "height", which is a natural number.

w: Tensor "width", which is a natural number.

c: Tensor "channels", which is a natural number.

hwc: Tensor resolution as a tuple of the height, width, and number of channels used for flow control in convolutional networks. For example, an input image in RGB colors may have c=3, meaning the input image has three channels including one channel for each of the red, green, and blue color intensities, respectively. If for example h=w=32, then hwc=(32, 32, 3).

In some embodiments, the resolution propagation may be performed by altering the operation nodes in the mutant segment. Operations are either mutable or immutable. Table 3 enumerates several common operation-node types and describes their ability to modify the h, w, and c attributes of an input tensor.

TABLE 3

Example operation nodes and whether they can modify the h, w, and c of an input tensor.

| Operation node type | Change h and/or w? | Change c? |
|---|---|---|
| Convolution (Conv2d) | Always reduces and/or maintains | Yes; can increase and/or decrease arbitrarily |
| Deconvolution (Conv2d_Transpose) | Always increases | Yes; can increase and/or decrease arbitrarily |
| Linear | No, when h = w = 1 | Yes; can increase and/or decrease arbitrarily |
| Pooling | Always reduces and/or maintains | No |
| Arithmetic operations (for example, addition, subtraction, element-wise multiplication) | No (When multiple inputs have the same hwc, returns one (1) output with the same hwc.) | |
| Activation functions (for example, ReLU) | No | No |
| Batch normalization | No | No |
| Concatenation | When multiple inputs have the same hw but different c's, returns one (1) output with the same hw but the sum of all input c's. | |

Thus, the resolution propagation problem may be considered a search task over the hwc values of each operation in the mutant segment to achieve proper propagation of the resolutions. In some embodiments, a solution to this problem is based on mixed-integer linear programming (MILP), wherein MILP is an optimization problem formulated with linear objectives, linear constraints, and integer-valued variables.

Among the intermediate nodes 708 to 718, which have operations Conv2d, BN, and ReLU, the nodes with operations BN and ReLU are immutable (that is, cannot change h, w, c). Therefore, a MLIP problem may be formed and solved at block 614 (see FIG. 10B) to adjust the resolutions of the two mutable, Conv2d-operation nodes 708 and 716 (each of the nodes 708 and 716 being on a respective path).

In this example, adjusting only one of the mutable, Conv2d-operation nodes 708 and 716, or leaving both nodes 708 and 716 unadjusted would result in incorrect propagation because the Add operation of node 720 require its incoming tensors to have the exact dimensions.

Resolution propagation may not be successful in some cases if, for example, the segment contains no operation nodes capable of adjusting the hwc in the desired manner. In such cases, the AutoGO method may determine that resolution propagation is infeasible and the modified CG is discarded. Otherwise, the AutoGO method generates a guideline indicating the operation nodes in the replacement segment that need to be adjusted for resolution propagation.

By using the MILP for resolution propagation, the segments gathered by the FSM/BPE methods may be utilized, so as to pair segments from different search spaces together, thereby further enabling mutation of segments in different sections of an input CG. Moreover, the MILP enables more efficient finding regarding if resolution propagation is feasible or infeasible, compared to enumerating all potential combinations of hwc values for each operation.

In some embodiments, instead of altering or otherwise modifying the operation nodes in the replacement segment 652, the resolution propagation may be performed by altering the operation nodes in the predecessor portion 632 and/or the successor portion 636 as needed.

B-7. Performance and Resource Metrics

In some embodiments, the AutoGO method considers two objectives when optimizing an input CG: (1) improving the performance (accuracy, peak signal-to-noise ratio (PSNR), and/or the like.) while (2) reducing resource metrics (FLOPS, parameters, energy consumption, and/or the like). It is often the case that these objectives are conflicting. For example, optimizing for accuracy metrics may lead to an increase in the number of FLOPS. Also, optimizing for one resource metric (such as FLOPs) may not correspond to optimizing for all resource metrics (for example, on-chip latency) as they may be hardware-dependent. Therefore, in these embodiments, the AutoGO method may generate an optimized output neural architecture further based on the hardware-dependency of relevant performance and resource metrics.

Table 4 lists some examples of performance and resource metrics that the AutoGO method may consider when optimizing a neural architecture. In these examples, some performance metrics are computer-vision-task-dependent (for example, accuracy may be an essential matric in classification), while precision and recall are used in recognition.

TABLE 4

Examples of performance and resource metrics.

| Metric | Units | Type | Hardware dependency |
|---|---|---|---|
| Accuracy | Percentage (%) | Performance | No |
| Precision | Percentage (%) | Performance | No |
| Recall | Percentage (%) | Performance | No |
| FLOPs | Integer units (typically $10^6$ or $10^9$) | Resource | No |
| On-chip latency | Time (for example, in milliseconds (ms)) | Resource | Yes |
| Energy consumption | Watts (W) | Resource | Yes |

The ability to consider different performance/resource metrics during optimization makes the AutoGO method flexible to be used in deployment environments, for example, to optimize network design for deployment on specific product hardware.

B-8. Applications of AutoGO Method

The AutoGO method disclosed herein may optimize the neural architecture of an ANN by optimizing the corresponding CG, thereby improving the performance of the ANN. As those skilled in the art will appreciate, AI such as ANNs greatly improves the functionality and performance of computing devices and computer systems. By optimizing the neural architectures, the AutoGO method disclosed herein may further improve the functionality and performance of computing devices and computer systems.

As described above, in some embodiments, the AutoGO method may be used in computer-vision applications such as those involving phone cameras.

For example, a scene-detection task may require a neural network model that classifies the scene of an image to be shot (such as portrait, nature, animal, day, night, and/or the like), and adjusts the camera setting accordingly. To process one frame, it requires latency L and energy consumption E, which are largely determined by the design of the network. Inappropriate minimization of L and E may result in an undesired reduction in the performance and accuracy of the model.

In some embodiments, the NAS incorporating the AutoGO method disclosed herein (also denoted “the NAS method disclosed herein”) may be used to optimize the network design to minimize L and/or E while maximizing its performance. An input neural network is usually a stand-alone, hand-crafted design for a specific task using expert knowledge. In these embodiments, the AutoGO method may tweak the input neural network to reduce L and/or E while preserving performance thereof. The AutoGO method disclosed herein may also be used in other tasks that require designing high-performing light-weight models, such as image denoising, image deblurring, face recognition, and/or the like.

In some embodiments, the AutoGO method disclosed herein may be used in various computer-vision products in Ascend offered by Huawei Technologies Co. Ltd. of Shenzhen, China, such as image classification, image segmentation, super resolution and image denoising.

When optimizing the CG of a neural architecture, the input to the AutoGO method is a DAG, and the output comprises one or more DAGs (that is, one or more modified CGs). For example, the AutoGO method may generate a Pareto frontier of the neural networks that give best performance on a plurality of objectives (such as accuracy and FLOPs), and return all of these neural networks. The AutoGO method uses a search process to create new DAGs guided by proxy performance metrics estimated or otherwise measured by the PSC predictor. Therefore, the AutoGO method may also be used as a general framework for DAG optimizations.

The AutoGO method disclosed herein may be used in various fields of AI. For example, in some embodiments, the AutoGO method may be used to optimize CNNs in computer-vision applications which operate on images for applications such as facial recognition, segmentation, and bounding box detection. In some other embodiments, the AutoGO method may be used in NLP-based applications to optimize AI models that process text or speech rather than images. As those skilled in the art understand, compared to typical CNNs, ANNs in NLP-based applications (denoted "NLP networks") are often larger, require more resources (such as data and computational power) to train, and more difficult to fit onto end-user mobile devices.

A popular building block of NLP networks is the attention-driven transformer block, which has also gained traction in computer-vision tasks in the form of vision transformer networks. As transformer-based models require a significant investment of resources to train adequately, it is important to ensure that the neural architecture thereof is of high quality and suitable for reducing the resource burden as much as possible. In some embodiments, the AutoGO method disclosed herein may be used to perform optimization on transformer-based networks by, for example, altering the matrix multiplication operations in different parts of the network (such as reducing the dimension of weights in less-important network regions and omitting portions of a transformer block in certain areas to reduce computation). Moreover, the AutoGO method may be performed with harsh resource metric constraints in optimization, such as ensuring that the CG of a neural architecture is sufficiently small to fit onto a selected target hardware (for example, the DaVinci platform and Huawei chipsets).

In various embodiments, the AutoGO method disclosed herein may be used to optimize various DAGs in various technical fields (rather than limited to DAGs or CGs of neural architectures). For example, in some embodiments, the AutoGO method may be used in the field of communication, wherein the AutoGO method may use the communication-network grid as an input DAG and generate an optimized or best routing graph between two endpoints. In these embodiments, each edge in the DAG may be associated with a communication cost, and the overall objective may be to reduce the total communication cost. In some embodiments, the AutoGO method deployed in one technical field may be transferred to another technical field with changes to the input/output format as required, re-populating the segment database, and re-training the PSC predictor.

In above embodiments, various examples of operations such as Conv2d, BN, and ReLU are described. Those skilled in the art will appreciate that the AutoGO method disclosed herein is not limited to handling the above-described operations. In other words, the AutoGO method in various embodiments may be used to process neural architectures and CGs thereof that have other operations such as PReLU (parametric rectified linear unit), GeLU (Gaussian error linear unit), and/or the like. The AutoGO method in various embodiments may be used to process neural architectures and CGs thereof that have segments from other domains such as NLP, and/or operations involving recurrent neural networks (RNNs), transformers, self-attention, and/or the like.

In some embodiments, the segment database 404 used in the AutoGO method may comprise any suitable CG segments such as segments extracted from CGs of neural architectures used in various technical fields (rather than segments extracted from CGs of neural architectures used in a specific technical field).

In various embodiments, the AutoGO method disclosed herein may handle CGs of various formats such as the ".pb" format, ".onnx" format, Keras, and/or the like.

In above embodiments, the AutoGO method extracts segments from an input CG using a combination of a FSM method and a BPE method. In some other embodiments, other suitable frequent subgraph mining methods may be used for extracting segments from an input CG.

Thus, the AutoGO method disclosed herein gives rise to an improved NAS method with multi-objectives of finding an architecture with high performance that is hardware-friendly (such as lower FLOPS, parameters, latency, energy, and/or the like). The AutoGO method disclosed herein also utilizes an evolutionary algorithm for search and leverages a predictor to estimate the performance of children's networks during the search.

While the NAS method disclosed herein may be similar to some prior-art NAS methods (such as DARTS, SNAS, NASNet, ENAS, NAO, GDAS, PC-DARTS, GA-NAS, L2NAS, Predictor-NAS, OFA, and the like), the NAS method disclosed herein is substantially different thereto with a variety of improvements.

More specifically, the following lists some similarities and differences between the NAS method disclosed herein and the prior-art NAS methods:

- Both the prior-art NAS methods and the NAS method disclosed herein output architectures with high performance (that is, similar outputs) as this is the common purpose of all NAS methods.
- Some prior-art NAS methods (such as Predictor-NAS and NAO) also rely on performance predictors as the performance proxy. However, their predictor is only applicable to their predefined search space.
- Some prior-art NAS methods also mine optimal subgraphs from neural networks. However, compared to the NAS method disclosed herein, these prior-art NAS methods use different methods with a shallow graph representation of a neural network and only in the DARTS search space.
- The NAS method disclosed herein differs substantially from the prior-art NAS methods. For example, in various embodiments, the NAS method disclosed herein uses CGs in NAS, and creates a searchable space by mining the units of computation instead of manually predefining them.
- The NAS method disclosed herein incrementally improves upon a given input neural architecture, while prior-art NAS trains a network from scratch according to a given dataset and task.

The NAS method disclosed herein solves at least some of the following issues in prior art:

- Prior-art NAS search spaces are inflexible as they are built upon expert rules and heuristics. Neural networks from one search space cannot be understood by software for a different search space. In prior art, the granularity of changes that can be made to neural networks in a search space is predefined which may impose biases and limits on the range of performance changes (for example, accuracy) or resource cost changes (for example, FLOPs, or on-chip latency) that can be made. By using CGs to represent neural architectures, the AutoGO method disclosed herein understands the structure of neural networks from distinct search spaces (or stand-alone neural networks), and uses subgraph-level mutations with variable numbers of nodes/edges to modified input CGs and therefore the granularity thereof.

The goal of NAS is the automation of neural network design and optimization. Using manually designed and hand-crafted search spaces restrict this goal. The AutoGO method disclosed herein circumvents this restriction by performing coarse-to-fine CG modifications, which may carefully tailor a neural architecture to be friendly with specific, niche hardware.

In prior art, search space in NAS requires a predefined set of searchable units over certain locations in a network structure. Adapting NAS to perform on CG requires defining these units over subgraphs, which is an expensive task to do as it has to span several subgraph locations within the CG. While FSM may be used for discovering interesting or frequent patterns in graphs. Typical FSM involves traversals over many possible subgraphs, which may cause high computational complexity in processing graphs such as CGs that have many nodes and edges. By combining FSM with NLP techniques such as BPE, the AutoGO method disclosed herein exploits the DAG structure using topological search and NLP techniques to perform efficient FSM.

Exiting NAS methods rely on performance predictors to predict the performance of a selected architecture during NAS search. Such predictors are dependent upon datasets (such as CIFAR10, CIFAR100, or the like) and tasks (such as image classification). Also, the prior-art predictors are generally unaware of the location in the network where a change occurs, and its context, although operation location may strongly influence the performance or latency response of the network. The AutoGO method disclosed herein uses a unique PSC predictor, which encodes the location where a change is taking place.

Tensor resolutions (such as height, width, and the number of channels) are different throughout search spaces and neural networks, which poses a challenge when editing a segment from one search space into another. To address this problem, the AutoGO method disclosed herein uses a resolution propagation MILP to evaluate the feasibility of CG mutations.

The objective of the AutoGO method disclosed herein extends the scope of NAS beyond the search spaces and computer-vision tasks provided in the literature. The AutoGO method disclosed herein combines aspects of multiple search spaces using a generalizable format and may perform optimization on stand-alone architectures for niche performance metrics, for example, power consumption.

The AI system 100 and the NAS method disclosed herein have various benefits. For example:

By using CGs to represent and modify neural architectures, the NAS method disclosed herein provides search-space generalizability, enabling combination of information from different search spaces and operation of neural networks beyond these search spaces and across tasks.

By combining FSM and BPE, the NAS method disclosed herein extracts segments with diverse characteristics in terms of size, topology, granularity, and/or the like. By applying the combined FSM and BPE on a topologically sorted sequence format of the graph, the NAS method disclosed herein provides improved efficiency.

The NAS method disclosed herein uses a PSC format predictor, which is aware of the location and the context of the segment mutation. The PSC format predictor is trained to be sensitive to changes within the neural network such as operation and resolutions mutations, thereby enabling ranking of neural architectures according to their performance with high accuracy.

By forming and solving a MILP problem, the NAS method disclosed herein is suitable for handing segments with different resolutions corresponding to different parts of the neural network and with rigidly defined search spaces, thereby enabling combined segments across search spaces, and utilization of knowledge between different neural architectural families. In other words, a subgraph mined from family X may contribute to performance of an architecture from family Y.

The NAS method disclosed herein provides robust optimization, and may optimize a performance metric while also optimizing a resource metric, wherein the selection of the performance and resource metrics may be flexible.

C. ACRONYMS

| Acronym | Full Name |
|---|---|
| NAS | Neural architecture search |
| AutoGO | Automatic graph optimization |
| CG | Computational graph |
| FSM | Frequent subgraph mining |
| CV | Computer vision |
| NLP | Natural language processing |
| BPE | Byte-pair encoding |
| FLOPs | Floating point operations |
| PSC | Predecessor, Segment, successor |
| MILP | Mixed integer linear programming |
| GNN | Graph neural network |
| DAG | Directed acyclic graph |
| CNN | Convolutional neural network |
| ViT | Vision transformer |

D. Definitions of Some Technical Terms

Neural architecture search (NAS): an automatic architecture search method or procedure (instead of a manual trial-and-error procedure) for finding neural network models with improved performance.

Computational graph (CG): a directed acyclic graph that describes the types of computations (convolution, add, ReLU, maxpool, and/or the like) and flow inside a neural network.

Computer vision (CV): afield of artificial intelligence that trains computers to interpret and understand the visual world.

Natural language processing (NLP): a branch of artificial intelligence or AI for providing computers with the ability to understand text and spoken words in a same or similar way as human beings can.

Byte-pair encoding (BPE): a robust data compression algorithm.

Floating point operations (FLOPs): the total number of add and multiply operations, typically defined for a neural network.

mixed integer linear programming (MILP): a mathematical optimization program in which some or all of the variables are restricted to be integers.

Graph neural network (GNN): a special type of neural network designed for graphical inputs.

Directed acyclic graph (DAG): a graph with directed edges and has no cycles.

Predecessor, segment, successor (PSC): a technique for encoding graphs that encodes a subgraph of a CG, while taking into consideration its preceding and succeeding subgraphs in a neural network, according to some aspects of this disclosure.

Convolutional neural network (CNN): a special type of neural network designed for image inputs. There are many manually designed CNN network families, for example, ResNet, Inception, MobileNet, MobileNeXt, and the like. The main differences between the CNN network families are the number of blocks/operators in the network, convolution block/operator types, and network topology (that is, operator connection patterns).

Convolution operator: a common operator used in CNNs. It has trainable weights and hence is responsible for learning generalizable knowledge from inputs. A convolution operator has many attributes, such as input/output channel size, kernel size, strides, dilations, groups, and/or the like, which may affect the computational cost and learning capability of the operator.

Vision transformer (ViT): a type of neural network designed for image inputs. It outperforms many CNNs.

Herein, various embodiments of the AI system 100 and the AutoGO method for NAS are described. Those skilled in the art will appreciate that such various embodiments and/or features thereof may be customized and/or combined as needed or desired. Moreover, although embodiments have been described above with reference to the accompanying drawings, those of skill in the art will appreciate that variations and modifications may be made without departing from the scope thereof as defined by the appended claims.

What is claimed is:

1. A computerized method comprising:

generating an input computational graph (CG) for representing a neural-network architecture, the input CG comprising one or more nodes each corresponding to an operation; and performing a plurality of optimization steps for at least one iteration to obtain a modified neural-network architecture represented by a modified CG for obtaining a neural network for use in one or more computing devices;

wherein the plurality of optimization steps comprise:

identifying one or more subgraphs from the input CG, obtaining the modified CG by replacing the identified one or more subgraphs with one or more replacement subgraphs, respectively, evaluating one or more metrics of a modified neural-network architecture represented by the modified CG, and based on the evaluation, selecting the modified CG or the input CG; and wherein, when the plurality of optimization steps are performed for a plurality of iterations, the selected CG obtained in one of the plurality of iterations is used as the input CG for a next one of the plurality of iterations.

2. The computerized method of claim 1 further comprising:

adjusting a first relationship between one or more inputs of each replacement subgraph and one or more outputs of a first portion of the modified CG before the replaced segment thereof such that they match each other, and/or adjusting a second relationship between one or more outputs of each replacement subgraph and one or more inputs of a second portion of the modified CG after the replaced segment thereof such that they match each other.

3. The computerized method of claim 1 further comprising:

using mixed-integer linear programming (MILP) to adjust a first relationship between one or more inputs of each replacement subgraph and one or more outputs of a first portion of the modified CG before the replaced segment thereof such that they match each other, and/or to adjust a second relationship between one or more outputs of each replacement subgraph and one or more inputs of a second portion of the modified CG after the replaced segment thereof such that they match each other.

4. The computerized method of claim 1, wherein said evaluating the one or more metrics of the modified neural-network architecture represented by the modified CG comprises:

evaluating the one or more metrics of the modified neural-network architecture represented by the modified CG under one or more constraints.

5. The computerized method of claim 1, wherein said selecting the modified CG or the input CG comprises:

using a Pareto frontier to select the modified CG or the input CG.

6. The computerized method of claim 1, wherein said identifying the one or more subgraphs from the input CG comprises:

for each node of the one or more nodes of the input CG, forming a triple therefor, the triple comprising the operation of the node, the operation of an incoming node thereof, and the operation of an outgoing node thereof;

encoding each triple to a symbol to obtain a symbol sequence according to a node-traversing order; and identifying one or more substring by search the one or more subgraphs in the symbol sequence, each of the one or more substrings representing a respective one of the one or more subgraphs.

7. The computerized method of claim 6, wherein the input CG is a directed acyclic graph (DAG) having a plurality of nodes and one or more directed edges each between a pair of the plurality of nodes; and wherein the computerized method further comprises:

topologically indexing the input CG by assigning each node of the plurality of nodes of the input CG with an number such that for every directed edge from a node i of the plurality of nodes to a node j of the plurality of nodes, the number for the node i is less than the number for the node j, and such that the numbers assigned to the plurality of nodes form the node-traversing order.

8. The computerized method of claim 1, wherein each of the identified one or more subgraphs and the corresponding one of the one or more replacement subgraphs have a same number of inputs and a same number of outputs.

9. The computerized method of claim 1, wherein said evaluating one or more metrics of a modified neural-network architecture represented by the modified CG comprises:

partitioning the modified CG into a segment partition comprising the one or more replacement subgraphs, a predecessor partition before the segment partition, and a successor partition after the segment partition;

using a graph neural network (GNN) with each of the predecessor partition, the segment partition, and the successor partition as input thereof to compute a vector of a fixed length for each of the predecessor partition, the segment partition, and the successor partition;

concatenating the vectors of the predecessor partition, the segment partition, and the successor partition to form a concatenated vector; and generating a performance estimate of the modified CG based on the concatenated vector.

10. The computerized method of claim 9, wherein said generating the performance estimate of the modified CG based on the concatenated vector comprises:

generating the performance estimate of the modified CG using a multi-layer perception (MLP) artificial neural network (ANN) with the concatenated vector as an input thereof.

11. One or more circuits for performing actions comprising:

generating an input computational graph (CG) for representing a neural-network architecture, the input CG comprising one or more nodes each corresponding to an operation; and performing a plurality of optimization steps for at least one round to obtain a modified neural-network architecture represented by a modified CG for obtaining a neural network for use in one or more computing devices;

wherein the plurality of optimization steps comprise:

extracting a plurality of subgraphs from the input CG, obtaining the modified CG by replacing one or more of the plurality of subgraphs with one or more replacement subgraphs, respectively, evaluating one or more metrics of a modified neural-network architecture represented by the modified CG, and based on the evaluation, selecting the modified CG or the input CG; and wherein, when the plurality of optimization steps are performed for a plurality of rounds, the selected CG obtained in one of the plurality of rounds is used as the input CG for a next one of the plurality of rounds.

12. The one or more circuits of claim 11, wherein said extracting a plurality of subgraphs from the input CG comprises:

for each node of the one or more nodes of the input CG, forming a triple therefor, the triple comprising the operation of the node, the operation of an incoming node thereof, and the operation of an outgoing node thereof, encoding each triple to a symbol to obtain a symbol sequence according to a node-traversing order;

collecting all unique single-symbol substrings of the symbol sequence;

collecting one or more multi-symbol substrings appeared in the symbol sequence for at least a predefined number of times; and converting the collected substrings to the plurality of extracted subgraphs.

13. The one or more circuits of claim 12, wherein the input CG is a directed acyclic graph (DAG) having a plurality of nodes and one or more directed edges each between a pair of the plurality of nodes; and wherein said extracting a plurality of subgraphs from the input CG further comprises:

topologically indexing the input CG by assigning each node of the plurality of nodes of the input CG with an number such that for every directed edge from a node i of the plurality of nodes to a node j of the plurality of nodes, the number for the node i is less than the number for the node j, and such that the numbers assigned to the plurality of nodes form the node-traversing order.

14. The one or more circuits of claim 11, wherein said obtaining the modified CG comprises:

replacing a selected one of the plurality of subgraphs with a replacement subgraph;

wherein the selected subgraph and the replacement subgraph have a same number of inputs and a same number of outputs.

15. The one or more circuits of claim 11, wherein said evaluating one or more metrics of a modified neural-network architecture represented by the modified CG comprises:

partitioning the modified CG into a segment partition comprising the one or more replacement subgraphs, a predecessor partition before the segment partition, and a successor partition after the segment partition;

using a graph neural network (GNN) with each of the predecessor partition, the segment partition, and the successor partition as input thereof to compute a vector of a fixed length for each of the predecessor partition, the segment partition, and the successor partition;

concatenating the vectors of the predecessor partition, the segment partition, and the successor partition to form a concatenated vector; and generating a performance estimate of the modified CG using a MLP ANN with the concatenated vector as an input thereof.

16. One or more non-transitory computer-readable storage devices comprising computer-executable instructions, wherein the instructions, when executed, cause one or more circuits to perform actions comprising:

generating an input computational graph (CG) for representing a neural-network architecture, the input CG comprising one or more nodes each corresponding to an operation; and performing a plurality of optimization steps for at least one round to obtain a modified neural-network architecture represented by a modified CG for obtaining a neural network for use in one or more computing devices;

wherein the plurality of optimization steps comprise:

extracting a plurality of subgraphs from the input CG, obtaining the modified CG by replacing one or more of the plurality of subgraphs with one or more replacement subgraphs, respectively, evaluating one or more metrics of a modified neural-network architecture represented by the modified CG, and based on the evaluation, selecting the modified CG or the input CG; and wherein, when the plurality of optimization steps are performed for a plurality of rounds, the selected CG obtained in one of the plurality of rounds is used as the input CG for a next one of the plurality of rounds.

17. The one or more non-transitory computer-readable storage devices of claim 16, wherein said extracting a plurality of subgraphs from the input CG comprises:

for each node of the one or more nodes of the input CG, forming a triple therefor, the triple comprising the operation of the node, the operation of an incoming node thereof, and the operation of an outgoing node thereof, encoding each triple to a symbol to obtain a symbol sequence according to a node-traversing order;

collecting all unique single-symbol substrings of the symbol sequence;

collecting one or more multi-symbol substrings appeared in the symbol sequence for at least a predefined number of times; and converting the collected substrings to the plurality of extracted subgraphs.

18. The one or more non-transitory computer-readable storage devices claim 17, wherein the input CG is a directed acyclic graph (DAG) having a plurality of nodes and one or more directed edges each between a pair of the plurality of nodes; and wherein said extracting a plurality of subgraphs from the input CG further comprises:

topologically indexing the input CG by assigning each node of the plurality of nodes of the input CG with an number such that for every directed edge from a node i of the plurality of nodes to a node j of the plurality of nodes, the number for the node i is less than the number for the node j, and such that the numbers assigned to the plurality of nodes form the node-traversing order.

19. The one or more non-transitory computer-readable storage devices of claim 16, wherein said obtaining the modified CG comprises:

replacing a selected one of the plurality of subgraphs with a replacement subgraph;

wherein the selected subgraph and the replacement subgraph have a same number of inputs and a same number of outputs.

20. The one or more non-transitory computer-readable storage devices of claim 16, wherein said evaluating one or more metrics of a modified neural-network architecture represented by the modified CG comprises:

partitioning the modified CG into a segment partition comprising the one or more replacement subgraphs, a predecessor partition before the segment partition, and a successor partition after the segment partition;

using a graph neural network (GNN) with each of the predecessor partition, the segment partition, and the successor partition as input thereof to compute a vector of a fixed length for each of the predecessor partition, the segment partition, and the successor partition;

concatenating the vectors of the predecessor partition, the segment partition, and the successor partition to form a concatenated vector; and generating a performance estimate of the modified CG using a MLP ANN with the concatenated vector as an input thereof.

* * * * *